United States Patent
Yamafuku et al.

(10) Patent No.: US 9,960,406 B2
(45) Date of Patent: May 1, 2018

(54) ENERGY STORAGE DEVICE AND METHOD OF MANUFACTURING ENERGY STORAGE DEVICE

(71) Applicant: GS Yuasa International Ltd., Kyoto-shi (JP)

(72) Inventors: Taro Yamafuku, Kyoto (JP); Kazuki Kawaguchi, Kyoto (JP); Masaki Masuda, Kyoto (JP); Masashi Takano, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 180 days.

(21) Appl. No.: 14/732,692

(22) Filed: Jun. 6, 2015

(65) Prior Publication Data

US 2015/0357624 A1    Dec. 10, 2015

(30) Foreign Application Priority Data

Jun. 9, 2014 (JP) .................................. 2014-118693
Jun. 9, 2014 (JP) .................................. 2014-118695

(51) Int. Cl.
*H01M 2/36* (2006.01)
*H01M 10/04* (2006.01)
*H01M 10/0587* (2010.01)
*H01M 2/02* (2006.01)
(Continued)

(52) U.S. Cl.
CPC .............. *H01M 2/36* (2013.01); *H01M 2/364* (2013.01); *H01M 10/0431* (2013.01); *H01G 11/78* (2013.01); *H01M 2/0217* (2013.01); *H01M 10/0525* (2013.01); *H01M 10/0587* (2013.01)

(58) Field of Classification Search
CPC ...... H01M 2/0217; H01M 2/36–2/368; H01M 10/0431; H01M 10/0587; H01M 10/0525; H01G 11/78
See application file for complete search history.

(56) References Cited

U.S. PATENT DOCUMENTS

2002/0028373 A1    3/2002    Tschirch
2011/0091752 A1    4/2011    Kim et al.
(Continued)

FOREIGN PATENT DOCUMENTS

JP    63-121365 U    8/1988
JP    H06-215798 A    8/1994
(Continued)

*Primary Examiner* — Eugenia Wang
(74) *Attorney, Agent, or Firm* — McGinn IP Law Group, PLLC.

(57) ABSTRACT

An energy storage device includes: a first guide portion which is arranged in the inside of a case and allows an electrolyte solution to flow toward one end of an electrode assembly in a winding axis direction from an electrolyte solution pouring hole; and a second guide portion which is arranged in the inside of the case and allows a fluid to flow toward the electrolyte solution pouring hole from the inside of the case, and which prevents the electrolyte solution from flowing toward the other end of the electrode assembly in the winding axis direction from the electrolyte solution pouring hole or suppresses the electrolyte solution from flowing toward the other end of the electrode assembly in the winding axis direction from the electrolyte solution pouring hole.

19 Claims, 15 Drawing Sheets

(51) Int. Cl.
  *H01G 11/78*    (2013.01)
  *H01M 10/0525*   (2010.01)

(56) References Cited

U.S. PATENT DOCUMENTS

| | | | |
|---|---|---|---|
| 2011/0104562 A1* | 5/2011 | Byun | H01M 2/06 429/181 |
| 2013/0244090 A1 | 9/2013 | Tanaka et al. | |
| 2014/0023912 A1 | 1/2014 | Ohira et al. | |
| 2014/0272609 A1* | 9/2014 | Nagayama | H01M 2/40 429/403 |
| 2015/0044529 A1* | 2/2015 | Yun | H01M 2/361 429/72 |
| 2015/0064550 A1 | 3/2015 | Kawasaki et al. | |

FOREIGN PATENT DOCUMENTS

| | | | | |
|---|---|---|---|---|
| JP | H 09-231960 A | 9/1997 | | |
| JP | H10-241741 A | 9/1998 | | |
| JP | 2001-506055 A | 5/2001 | | |
| JP | 2001-273884 A | 10/2001 | | |
| JP | 2002-050396 A | 2/2002 | | |
| JP | 2004-022502 A | 1/2004 | | |
| JP | 2005-251738 A | 9/2005 | | |
| JP | 2009-218078 A | 9/2009 | | |
| JP | 2010-176989 A | 8/2010 | | |
| JP | 2011-054539 A | 3/2011 | | |
| JP | 2011-086604 A | 4/2011 | | |
| JP | 2011-238486 A | 11/2011 | | |
| JP | 2012-160312 A | 8/2012 | | |
| JP | 2013-168239 A | 8/2013 | | |
| JP | 2013-219027 A | 10/2013 | | |
| JP | 5336023 B1 | 11/2013 | | |
| JP | 2013-257951 A | 12/2013 | | |
| JP | 2014-022073 A | 2/2014 | | |
| JP | 2014-022337 A | 2/2014 | | |
| JP | 2014-107147 A | 6/2014 | | |
| JP | 2015-032503 A | 2/2015 | | |
| WO | WO 2013058035 A1 * | 4/2013 | | H01M 2/40 |

* cited by examiner

ENERGY STORAGE DEVICE AND METHOD OF MANUFACTURING ENERGY STORAGE DEVICE

CROSS-REFERENCE TO RELATED APPLICATIONS

This application claims the benefit of Japanese patent applications No. 2014-118693, filed on Jun. 9, 2014, and No. 2014-118695, filed on Jun. 9, 2014, which are incorporated by reference.

FIELD

The present invention relates to an energy storage device provided with an electrode assembly formed by winding electrodes and a separator, and a method of manufacturing an energy storage device.

BACKGROUND

Conventionally, there has been known a nonaqueous electrolyte secondary battery provided with a wound-type electrode assembly (see JP-A-2013-219027). To be more specific, the nonaqueous electrolyte secondary battery includes: an electrode assembly formed by winding an electrode having positive polarity (positive electrode), an electrode having negative polarity (negative electrode) and a separator; a battery container which houses the electrode assembly together with an electrolyte solution; a lid which is a lid for closing an opening of the battery container and in which an electrolyte solution pouring port is formed; and a sealing plug which seals the electrolyte solution pouring port. In the electrode assembly, strip-like electrodes and strip-like separator are wound around in an alternately layered state.

In manufacturing steps of the above-mentioned nonaqueous electrolyte secondary battery, the opening formed in the battery container in which the electrode assembly is stored is closed by the lid, the electrolyte solution is poured in the battery container through the electrolyte solution pouring port formed in the lid and, thereafter, the electrolyte solution pouring port is sealed by the sealing plug. In the inside of the battery container, the poured electrolyte solution impregnates (infiltrates) into the inside of the electrode assembly. The impregnation of the electrolyte solution is specifically described below.

The electrode assembly is formed by winding the electrodes and the separator in a layered state. Accordingly, the electrolyte solution poured in the battery container impregnates into spaces formed between the electrodes and the separator wound in a layered state from an end portion of the electrode assembly in the winding axis direction. In this case, the electrolyte solution infiltrates into the inside of the electrode assembly from both ends of the electrode assembly in the winding axis direction respectively and hence, a part of a gas such as air present in a space between the electrode and the separator may not be discharged from the space between the electrode and the separator (that is, a part of the gas may be confined in a center portion of the electrode assembly by the electrolyte solution which impregnates into the inside of the electrode assembly from both end of the electrode assembly), and may be left at the center portion of the electrode assembly in the winding axis direction.

In this case, the electrolyte solution may not impregnate into the inside of the whole electrode assembly uniformly and hence, a formed state of a negative electrode protection film (solid electrolyte interface: SEI) in the inside of the electrode assembly may become non-uniform. In a portion of the electrode assembly where the formation of the negative electrode protection film is insufficient, charge-discharge is repeated in the nonaqueous electrolyte secondary battery and hence, an irreversible reaction is liable to progress in such a portion compared with other portions.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage device in which the impregnation of an electrolyte solution into the inside of an electrode assembly is unlikely to become non-uniform, and a method of manufacturing an energy storage device.

An energy storage device according to an aspect of the present invention includes: an electrode assembly formed by winding electrodes and a separator in a layered state; a case for storing the electrode assembly therein, the case having an electrolyte solution sealing portion where an electrolyte solution pouring hole formed in the case is sealed; a first guide portion which is arranged in the case and allows an electrolyte solution to flow toward one end of the electrode assembly in a winding axis direction from the electrolyte solution pouring hole; and a second guide portion which is arranged in the case and allows a fluid to flow toward the electrolyte solution pouring hole from the inside of the case, and which prevents the electrolyte solution from flowing toward the other end of the electrode assembly in the winding axis direction from the electrolyte solution pouring hole or suppresses the electrolyte solution from flowing toward the other end of the electrode assembly in the winding axis direction from the electrolyte solution pouring hole.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
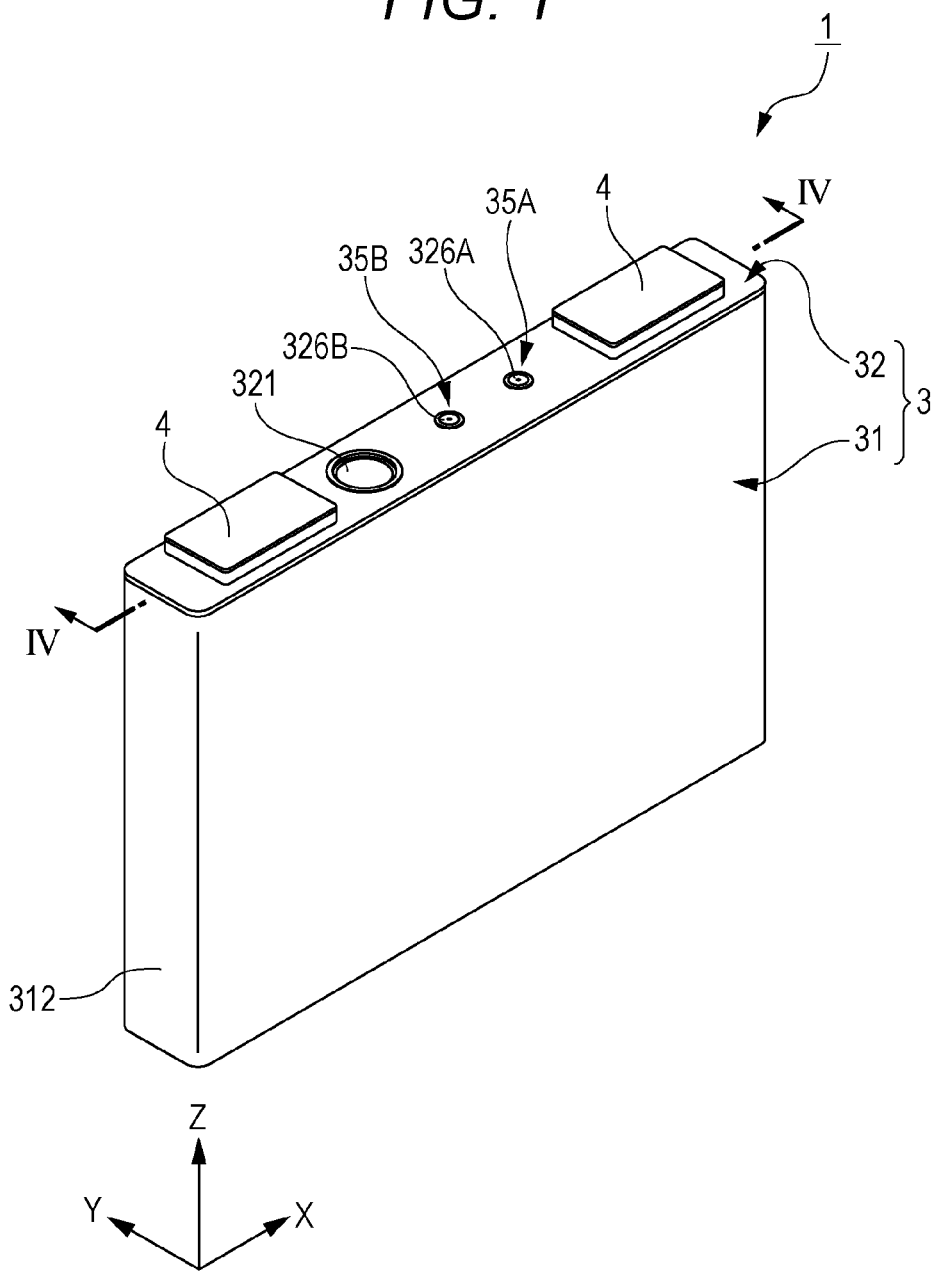
FIG. 1 is a perspective view of an energy storage device according to one embodiment of the present invention.
Figure 2:
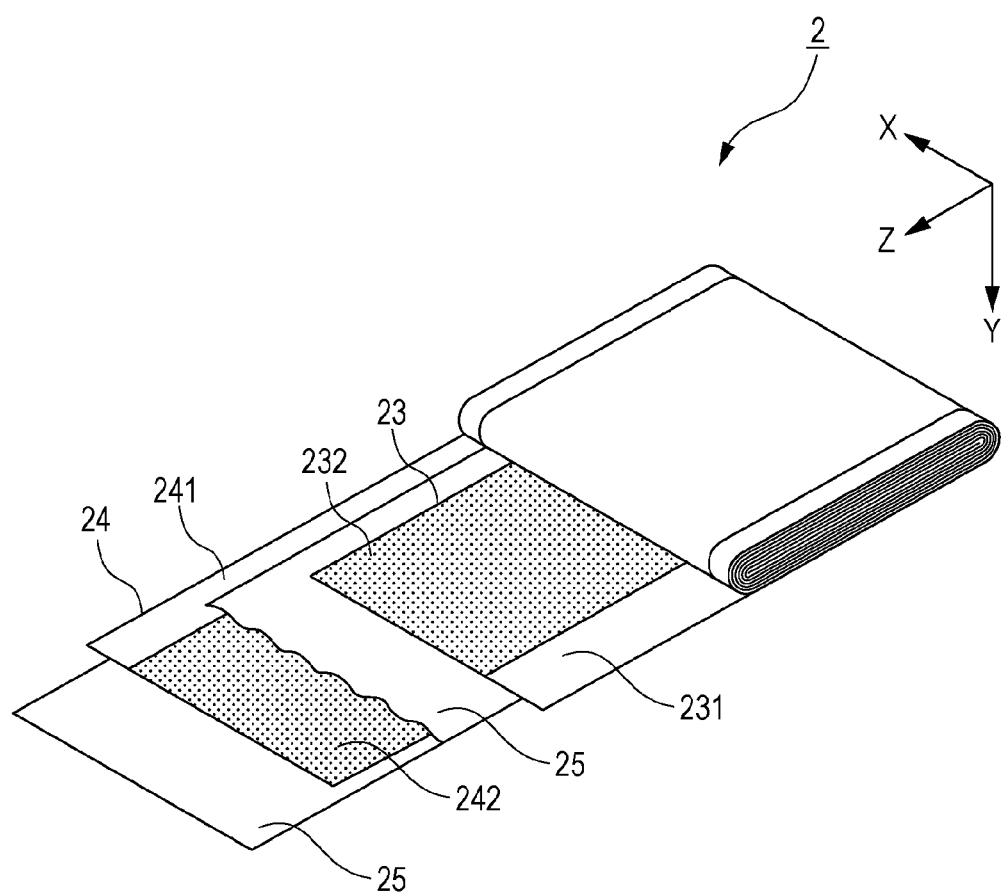
FIG. 2 is a view describing the configuration of an electrode assembly of the energy storage device according to the embodiment.

According to an aspect of the present invention, there is provided an energy storage device including: an electrode assembly formed by winding electrodes and a separator in a layered state; a case for storing the electrode assembly therein, the case having an electrolyte solution sealing portion where an electrolyte solution pouring hole formed in the case is sealed; a first guide portion which is arranged in the case and allows an electrolyte solution to flow toward one end of the electrode assembly in a winding axis direction from the electrolyte solution pouring hole; and a second guide portion which is arranged in the case and allows a fluid to flow toward the electrolyte solution pouring hole from the inside of the case, and which prevents the electrolyte solution from flowing toward the other end of the electrode assembly in the winding axis direction from the electrolyte solution pouring hole or suppresses the electrolyte solution from flowing toward the other end of the electrode assembly in the winding axis direction from the electrolyte solution pouring hole.

With this configuration, by the first and second guide portions, an electrolyte solution poured in the inside of the case through the electrolyte solution pouring hole is guided toward one end of the electrode assembly in the winding axis direction of the electrode assembly, and the electrolyte solution is prevented from flowing toward the other end of the electrode assembly in the winding axis direction or the electrolyte solution is minimally allowed to flow toward the other end of the electrode assembly in the winding axis direction and hence, one end of the electrode assembly can be easily brought into contact with the poured electrolyte solution compared with the other end of the electrode assembly. Accordingly, at the time of manufacturing an energy storage device (at the time of pouring an electrolyte solution), the electrolyte solution can easily impregnate (infiltrate) into the inside of the electrode assembly from one end of the electrode assembly and hence, it is possible to prevent that the impregnation of the electrolyte solution into the inside of the electrode assembly becomes non-uniform. That is, the electrolyte solution poured into the inside of the case is guided toward one end of the electrode assembly, and the flow of the electrolyte solution toward the other end of the electrode assembly is prevented or obstructed. Accordingly, the electrolyte solution easily impregnates into the electrode assembly toward the other end from one end of the electrode assembly and hence, a gas which is present between the electrodes and the separator before the pouring of the electrolyte solution is discharged from the other end of the electrode assembly such that the gas is pushed out by the impregnated electrolyte solution. As a result, the gas minimally remains in the inside of the electrode assembly when the electrolyte solution impregnates into the inside of the electrode assembly. Accordingly, it is possible to obtain an energy storage device where the impregnation of an electrolyte solution to the inside of the electrode assembly minimally becomes non-uniform.

In the energy storage device, the case may have a discharge sealing portion where a discharge hole formed in the case is sealed, and the discharge hole may be formed at a position closer to the other end of the electrode assembly than the electrolyte solution pouring hole is in the winding axis direction of the electrode assembly.

With this configuration, when an electrolyte solution is poured in the inside of the case through the electrolyte solution pouring hole, a fluid (air or the like) in the inside of the case can be discharged to the outside through the discharge hole and hence, it is possible to prevent that an internal pressure of the case is increased due to the pouring of an electrolyte solution so that the pouring of the electrolyte solution becomes difficult. Further, the discharge hole is formed at a position closer to the other end of the electrode assembly (that is, a position remote from one end of the electrode assembly) and hence, at the time of pouring an electrolyte solution, the electrolyte solution guided toward one end of the electrode assembly is minimally discharged to the outside through the discharge hole whereby the electrolyte solution can be efficiently poured in the inside of the case.

In the energy storage device, the discharge hole may be formed at a position where a fluid which passes the second guide portion is allowed to be discharged to the outside of the case, the position being closer to the second guide portion than the electrolyte solution pouring hole is, and the electrolyte solution pouring hole may be formed at a position closer to the first guide portion than the discharge hole is.

With this configuration, the discharge hole is formed at the position closer to the second guide portion than the electrolyte solution pouring hole is and hence, a fluid (air or the like) in the inside of the case which passes the second guide portion can be discharged more easily through the discharge hole than through the electrolyte solution pouring hole. Accordingly, an electrolyte solution poured through the electrolyte solution pouring hole flows through the first guide portion and is supplied to one end of the electrode assembly. Further, a fluid (air or the like) in the inside of the case which passes through the second guide portion can be easily discharged to the outside through the discharge hole.

In the energy storage device, the first guide portion may have a check valve which allows a fluid to flow toward one end of the electrode assembly from the electrolyte solution pouring hole, and prevents a fluid from flowing toward the electrolyte solution pouring hole from the inside of the case.

In this manner, by making use of the check valve, it is possible to easily provide the power storage device having the configuration where, in the first guide portion, an electrolyte solution is allowed to flow toward one end of the electrode assembly from the electrolyte solution pouring hole and a fluid is prevented from flowing toward the electrolyte solution pouring hole from the inside of the case.

In the energy storage device, the second guide portion may have a check valve which allows a fluid to flow toward the electrolyte solution pouring hole from the inside of the case, and prevents a fluid from flowing toward the other end of the electrode assembly through the electrolyte solution pouring hole.

In this manner, by making use of the check valve, it is possible to easily provide the power storage device having the configuration where, in the second guide portion, a fluid is allowed to flow toward the electrolyte solution pouring hole from the inside of the case and an electrolyte solution is prevented from flowing toward the other end of the electrode assembly through the electrolyte solution pouring hole.

In the energy storage device, the second guide portion may have a mesh member which is arranged so as to intersect with a flow passage of a fluid flowing toward the electrolyte solution pouring hole from the inside of the case.

The viscosity of a liquid is higher than the viscosity of a gas and hence, it is more difficult for a liquid to pass through the mesh member than for a gas. Accordingly, with the above-mentioned configuration, it is possible to provide the power storage device having the configuration where, using a simple configurational member, a gas such as air can easily flow toward the electrolyte solution pouring hole or the like from the inside of the case, and an electrolyte solution is minimally allowed to flow toward the electrode assembly from the electrolyte solution pouring hole.

In the energy storage device, the first guide portion and the second guide portion may be formed into an integral body.

With this configuration, the number of parts can be reduced, and the internal structure of the case can be simplified.

According to another aspect of the present invention, there is provided a method of manufacturing an energy storage device which includes an electrode assembly formed by winding electrodes and a separator in a layered state, and a case for storing the electrode assembly therein, the case having an electrolyte solution sealing portion where an electrolyte solution pouring hole formed in the case is sealed, wherein the method includes: pouring an electrolyte solution in the case through the electrolyte solution pouring hole which is in a non-sealed state, the case being provided with, in the inside of the case: a first guide portion which is arranged in the case and allows an electrolyte solution to flow toward one end of the electrode assembly in a winding axis direction from the electrolyte solution pouring hole; and a second guide portion which is arranged in the case and allows a fluid to flow toward the electrolyte solution pouring hole from the inside of the case, and which prevents an electrolyte solution from flowing toward the other end of the electrode assembly in the winding axis direction from the electrolyte solution pouring hole or suppresses the electrolyte solution from flowing toward the other end of the electrode assembly in the winding axis direction from the electrolyte solution pouring hole.

With this configuration, by the first and second guide portions, an electrolyte solution poured in the inside of the case through the electrolyte solution pouring hole is guided toward one end of the electrode assembly in the winding axis direction of the electrode assembly, and the electrolyte solution is prevented from flowing toward the other end of the electrode assembly in the winding axis direction or the electrolyte solution is minimally allowed to flow toward the other end of the electrode assembly in the winding axis direction and hence, one end of the electrode assembly can be easily brought into contact with the poured electrolyte solution compared with the other end of the electrode assembly. Accordingly, at the time of pouring an electrolyte solution, the electrolyte solution can easily impregnate (infiltrate) into the inside of the electrode assembly from one end of the electrode assembly and hence, it is possible to prevent that the impregnation of an electrolyte solution into the inside of the electrode assembly becomes non-uniform. That is, the electrolyte solution poured into the inside of the case is guided toward one end of the electrode assembly, and the electrolyte solution is prevented or minimally allowed to flow toward the other end of the electrode assembly and hence, the electrolyte solution easily impregnates into the electrode assembly toward the other end from one end of the electrode assembly whereby a gas which is present between the electrodes and the separator before the pouring of the electrolyte solution is discharged from the other end of the electrode assembly such that the gas is pushed out by the impregnated electrolyte solution. As a result, the gas minimally remains in the inside of the electrode assembly when the electrolyte solution impregnates into the inside of the electrode assembly. Accordingly, in the energy storage device, the impregnation of an electrolyte solution to the inside of the electrode assembly minimally becomes non-uniform.

In the method of manufacturing an energy storage device, the case may include a discharge sealing portion where a discharge hole formed in the case is sealed, the discharge hole may be formed at a position closer to the other end of the electrode assembly than the electrolyte solution pouring hole is in the winding axis direction, and the pouring of the electrolyte solution may be performed in a state where the discharge hole is not sealed.

With this configuration, when an electrolyte solution is poured in the inside of the case through the electrolyte solution pouring hole, a fluid (air or the like) in the inside of the case can be discharged to the outside through the discharge hole and hence, it is possible to prevent that an internal pressure of the case is increased due to the pouring of an electrolyte solution so that the pouring of the electrolyte solution becomes difficult. Further, the discharge hole is formed at a position closer to the other end of the electrode assembly (that is, a position remote from one end of the electrode assembly) and hence, at the time of pouring an electrolyte solution, the electrolyte solution guided toward one end of the electrode assembly is minimally discharged to the outside through the discharge hole whereby the electrolyte solution can be efficiently poured in the inside of the case.

In this case, it is preferable that the method of manufacturing an energy storage device include a step of bringing the inside of the case into a state where a pressure is lower than an atmospheric pressure by discharging a fluid which is present in the case to the outside through the discharge hole, and the pouring of the electrolyte solution be performed together with bringing the inside of the case into a low pressure state or after bringing the inside of the case into a low pressure state.

With this configuration, the electrolyte solution is sucked into the inside of the case during the pouring of the electrolyte solution and hence, the electrolyte solution can be easily poured in the inside of the case.

The method of manufacturing an energy storage device may include a step of bringing the inside of the case into a state where a pressure is lower than an atmospheric pressure by discharging a fluid which is present in the case to the outside through the electrolyte solution pouring hole, portions of the case except for the electrolyte solution pouring hole may have the airtight structure, and the pouring of the electrolyte solution may be performed after bringing the inside of the case into a low pressure state.

With this configuration, it is no more necessary to provide the discharge hole for bringing the inside of the case into a low pressure state by discharging a fluid such as a gas, the member for sealing the discharge hole and hence, the configuration of the case can be simplified and, at the same time, it is possible to omit an operation of sealing the discharge hole after discharging a fluid.

In the method of manufacturing an energy storage device, it is preferable that in the pouring of an electrolyte solution, the electrolyte solution be poured in the case with the case held in a posture where one end of the electrode assembly is positioned below the other end of the electrode assembly.

With this configuration, one end of the electrode assembly is positioned below the other end of the electrode assembly and hence, the electrolyte solution guided by the first guide portion easily flows to an area in the vicinity of one end of the electrode assembly due to the gravity, and the electrolyte solution guided by the first guide portion is minimally allowed to flow toward the other end of the electrode assembly. As a result, it is possible to make an electrolyte solution efficiently impregnate into the inside of the electrode assembly from one end of the electrode assembly.

In this case, it is preferable that in the pouring of an electrolyte solution, the electrolyte solution be poured in the case with the case held in a posture where a winding axis direction of the electrode assembly stored in the case is directed in the vertical direction.

With this configuration, an electrolyte solution is poured in the case held in a posture where a position in the inside of the case where the electrolyte solution is guided (one end of the electrode assembly) constitutes a lower end of the case and one end of the electrode assembly is directed downward and hence, the whole end portion of the electrode assembly on one end side can be easily brought into contact with an electrolyte solution whereby it is possible to make an electrolyte solution efficiently impregnate into the inside of the electrode assembly.

In the method of manufacturing an energy storage device, the first guide portion may have a check valve which allows a fluid to flow toward one end of the electrode assembly from the electrolyte solution pouring hole, and prevents a fluid from flowing toward the electrolyte solution pouring hole from the inside of the case.

In this manner, by making use of the check valve, it is possible to easily provide the power storage device having the configuration where, in the first guide portion, an electrolyte solution is allowed to flow toward one end of the electrode assembly from the electrolyte solution pouring hole, and a fluid is prevented from flowing toward the electrolyte solution pouring hole from the inside of the case.

In the method of manufacturing an energy storage device, the second guide portion may have a check valve which allows a fluid to flow toward to the electrolyte solution pouring hole from the inside of the case, and prevents a fluid from flowing toward the other end of the electrode assembly through the electrolyte solution pouring hole.

In this manner, by making use of the check valve, it is possible to easily provide the power storage device having the configuration where, in the second guide portion, a fluid is allowed to flow toward the electrolyte solution pouring hole from the inside of the case, and an electrolyte solution is prevented from flowing toward the other end of the electrode assembly through the electrolyte solution pouring hole.

In the method of manufacturing an energy storage device, the second guide portion may have a mesh member which is arranged so as to intersect with a flow passage of a fluid flowing toward the electrolyte solution pouring hole from the inside of the case.

A viscosity of a liquid is higher than a viscosity of a gas and hence, it is more difficult for a liquid to pass through a mesh member than for a gas. Accordingly, with the above-mentioned configuration, it is possible to provide the power storage device having the configuration where a gas such as air is allowed to flow more easily toward the electrolyte solution pouring hole or the like from the inside of the case, and an electrolyte solution is minimally allowed to flow toward the electrode assembly from the electrolyte solution pouring hole.

As described above, according to the aspects of the present invention, it is possible to provide the energy storage device where the impregnation of an electrolyte solution to the inside of the electrode assembly minimally becomes non-uniform, and a method of manufacturing an energy storage device.

Hereinafter, one embodiment of an energy storage device according to the present invention is described by reference to FIG. 1 to FIG. 10. The energy storage device may be a primary battery, a secondary battery, a capacitor or the like. In this embodiment, as one example of the energy storage device, a chargeable/dischargeable secondary battery is described. Names of respective members (respective components) used in this embodiment are exclusively for this embodiment, and may differ from names of respective members (respective components) used in the BACKGROUND section.

The energy storage device of this embodiment is a non-aqueous electrolyte secondary battery. To be more specific, the energy storage device is a lithium ion secondary battery which makes use of the electron movement generated due to the movement of lithium ions. The energy storage device of this type supplies electrical energy. The number of energy storage devices used is one or more. More specifically, when a required output and a required voltage are small, the number of energy storage devices used is one. On the other hand, when at least one of either a required output or a required voltage is large, the energy storage device is used as an energy storage apparatus in combination with other energy storage devices. In the energy storage apparatus, the energy storage device or energy storage devices used in the energy storage apparatus supply electrical energy.

As shown in FIGS. 1 to 4, the energy storage device includes: an electrode assembly 2 formed by winding electrodes 23, 24 and a separator 25 in a layered state; a case 3 for storing the electrode assembly 2 therein; a first guide portion 81 and a second guide portion 82 which are arranged in the inside of the case 3; and external terminals 4 which are arranged outside the case 3, and are conductive with the electrode assembly 2. In this embodiment, the first guide portion 81 and the second guide portion 82 are formed into an integral body, and constitute a guide portion 8. That is, in this embodiment, the energy storage device 1 includes the guide portion 8, and the guide portion 8 is configured by the first guide portion 81 and the second guide portion 82. The energy storage device 1 also includes current collectors 5 which make the electrode assembly 2 and the external terminals 4 conductive with each other and the like besides the electrode assembly 2, the case 3, the guide portion 8, and the external terminals 4. To be more specific, the energy storage device has the following configuration.

The electrode assembly includes: a strip-like electrode (positive electrode) 23 having positive polarity; and a strip-like electrode (negative electrode) 24 having negative polarity. The electrode assembly 2 is formed by winding the positive electrode 23 and the negative electrode 24 in a state where the positive electrode 23 and the negative electrode 24 are insulated from each other.

The positive electrode 23 includes a metal foil and a positive active material layer formed on the metal foil. The metal foil has a strip shape. The metal foil in this embodiment is an aluminum foil, for example. The positive electrode 23 has a non-coated portion 231 which is not coated by the positive active material layer (a portion on which the positive active material layer is not formed) at one edge portion thereof in the width direction which is a short-length direction of the strip shape. The portion of the positive electrode 23 on which the positive active material layer is formed is referred to as a coated portion 232.

The negative electrode 24 includes a metal foil and a negative active material layer formed on the metal foil. The metal foil has a strip shape. The metal foil in this embodiment is a copper foil, for example. The negative electrode 24 has a non-coated portion 241 which is not coated by the negative active material layer (a portion on which the negative active material layer is not formed) at the other edge portion thereof (on a side opposite to the non-coated portion 231 of the positive electrode 23) in the width direction which is a short-length direction of the strip shape. The portion of the negative electrode 24 on which the negative active material layer is formed is referred to as a coated portion 242.

In the electrode assembly 2 of this embodiment, the positive electrode 23 and the negative electrode 24 having the above-mentioned configuration are wound in a state where the positive electrode 23 and the negative electrode 24 are insulated from each other by the separator 25. The separator 25 is a strip-like member having insulating property. The separator 25 is arranged between the positive electrode 23 and the negative electrode 24. Due to such arrangement of the separator 25, the positive electrode 23 and the negative electrode 24 are insulated from each other in the electrode assembly 2. The separator 25 retains an electrolyte solution in the inside of the case 3. Accordingly, at the time of charging or discharging the energy storage device 1, lithium ions are movable between the positive electrode 23 and the negative electrode 24 which are alternately layered with the separator 25 interposed therebetween.

Figure 3:
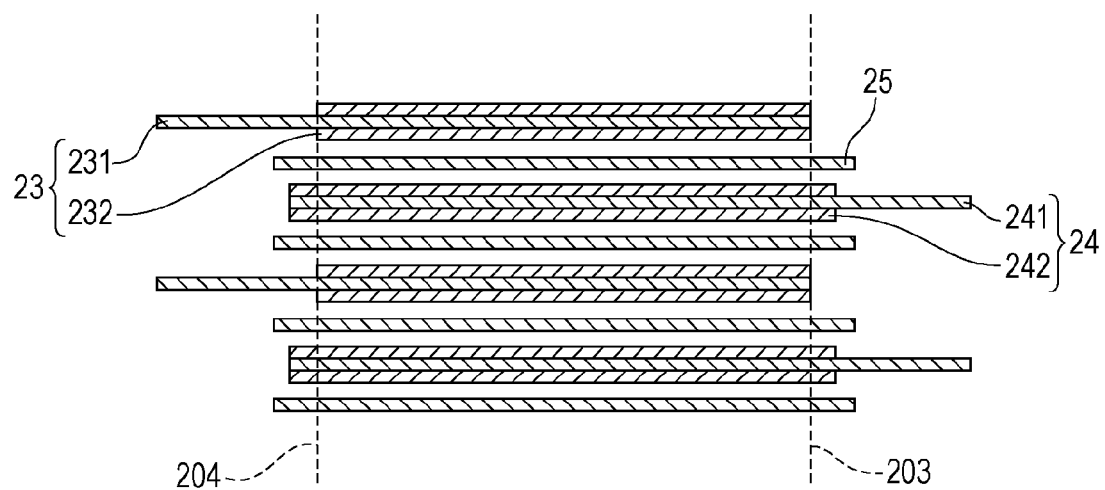
FIG. 3 is a view describing a layered state of a positive electrode, a negative electrode, and a separator.

As shown in FIG. 3, the separator 25 is arranged between the positive electrode 23 and the negative electrode 24 which overlap with each other in a displaced manner in the width direction such that the coated portion 232 and the coated portion 242 overlap with each other. Here, the non-coated portion 231 of the positive electrode 23 and the non-coated portion 241 of the negative electrode 24 do not overlap with each other. That is, the non-coated portion 231 of the positive electrode 23 projects in the width direction from a region where the positive electrode 23 and the negative electrode 24 overlap with each other, and the non-coated portion 241 of the negative electrode 24 projects in the width direction (the direction opposite to the direction where the non-coated portion 231 of the positive electrode 23 projects) from the region where the positive electrode 23 and the negative electrode 24 overlap with each other. The electrode assembly 2 is formed by winding the positive electrode 23, the negative electrode 24, and the separator 25 in the above-mentioned layered state. In FIG. 3, to facilitate the description of the relative position between the positive electrode 23, the negative electrode 24, and the separator 25, thicknesses of the respective elements are described in an exaggerated manner.

The case 3 includes: a case body 31 having an opening; and a lid plate 32 which closes (seals) the opening of the case body 31. The case 3 has an electrolyte solution sealing portion 35A where an electrolyte solution pouring hole 325A formed in the case 3 is sealed. The case 3 also has a discharge sealing portion 35B where a discharge hole 325B formed in the case 3 is sealed. The case 3 stores an electrolyte solution in an inner space 33 together with the electrode assembly 2, the current collectors 5 and the like. The case 3 is made of metal having resistance against an electrolyte solution. The electrolyte solution is a nonaqueous electrolyte solution. The electrolyte solution can be obtained by dissolving an electrolyte salt in an organic solvent.

The case 3 has a rectangular parallelepiped shape. That is, the energy storage device 1 of this embodiment is a so-called prismatic battery. The case 3 is formed by joining an opening peripheral portion of the case body 31 and a peripheral portion of the lid plate 32 in a state where the opening peripheral portion of the case body 31 and the peripheral portion of the lid plate 32 overlap with each other. The case 3 has the inner space 33 defined by the case body 31 and the lid plate 32.

The case body 31 includes: a plate-shaped closed portion 311; and a cylindrical barrel portion 312 connected to a peripheral edge of the closed portion 311.

The closed portion 311 is a portion which is positioned at a lower end of the case body 31 when the case body 31 is arranged with the opening directed upward (that is, a portion which forms a bottom wall of the case body 31 when the case body 31 is arranged with the opening directed upward). The closed portion 311 has a rectangular shape as viewed in the normal direction of the closed portion 311. Hereinafter, as shown in FIG. 1, assume the long axis direction of the closed portion 311 as the X axis direction, the short axis direction of the closed portion 311 as the Y axis direction, and the normal direction of the closed portion 311 as the Z axis direction.

The barrel portion 312 in this embodiment has an angular cylindrical shape. To be more specific, the barrel portion 312 has a flattened angular cylindrical shape.

As described above, the case body 31 has an angular cylindrical shape with one end portion in the opening direction (Z axis direction) thereof closed (that is, a bottomed angular cylindrical shape).

The lid plate 32 is a plate-shaped member which closes the opening of the case body 31. To be more specific, the peripheral portion of the lid plate 32 is made to overlap with the opening peripheral portion of the case body 31 such that the lid plate 32 closes the opening of the case body 31. In a state where the opening peripheral portion and the lid plate 32 are made to overlap with each other, a boundary portion between the lid plate 32 and the case body 31 is welded to each other thus forming the case 3.

The lid plate 32 has a profile shape corresponding to the opening peripheral portion of the case body 31 as viewed in the Z axis direction. That is, the lid plate 32 is formed of a plate member having an elongated rectangular shape extending in the X axis direction as viewed in the Z axis direction.

The lid plate 32 has a gas release vent 321 which can discharge a gas in the inside of the case 3 to the outside. The gas release vent 321 discharges a gas to the outside from the inside of the case 3 when an internal pressure in the case 3 is elevated to a predetermined pressure. The gas release vent 321 in this embodiment is mounted on the lid plate 32 at a position offset to one end portion (left end portion in FIG. 4) with respect to a center position of the lid plate 32 in the X axis direction.

To be more specific, the gas release vent 321 has a thin wall portion on which a breaking groove is formed. In the gas release vent 321, when an internal pressure (gas pressure) in the case 3 becomes larger than a predetermined value, the thin wall portion is torn starting from the breaking groove so that the inside of the case 3 (inner space 33) and the outside (outer space) communicate with each other. Accordingly, the gas release vent 321 discharges a gas in the case 3 to the outside. In this manner, the gas release vent 321 lowers the elevated internal pressure in the case 3.

A pair of through holes 322 which makes the inside and the outside of the case 3 communicate with each other is formed in the lid plate 32. The through hole 322 is formed in both end portions of the lid plate 32 in the X axis direction respectively (see FIG. 4). Penetration members 7 described later are made to pass through the through holes 322 respectively.

An electrolyte solution pouring hole 325A for pouring an electrolyte solution into the case 3 is formed in the case 3. The electrolyte solution pouring hole 325A makes the inside and the outside of the case 3 communicate with each other. In this embodiment, the electrolyte solution pouring hole 325A is formed in the lid plate 32. The electrolyte solution pouring hole 325A penetrates the lid plate 32 in the Z axis direction (thickness direction). The electrolyte solution pouring hole 325A is disposed between the gas release vent 321 and either one of the pair of through holes 322 (right through hole 322 in FIG. 4) in the X axis direction. To be more specific, the electrolyte solution pouring hole 325A is formed at a position corresponding to the guide portion 8 arranged in the inside of the case 3.

The electrolyte solution pouring hole 325A having the above-mentioned configuration is hermetically closed (sealed) by an electrolyte solution pouring plug 326A thus forming an electrolyte solution sealing portion 35A on the case 3. That is, the electrolyte solution sealing portion 35A includes: the electrolyte solution pouring hole 325A; and the electrolyte solution pouring plug 326A. In this embodiment, the electrolyte solution pouring plug 326A is fixed to the case 3 (the lid plate 32 in this embodiment) by welding. To be more specific, the electrolyte solution pouring plug 326A includes: a head portion which covers the electrolyte solution pouring hole 325A; and an insertion portion which extends from the head portion.

The head portion is a portion which covers the electrolyte solution pouring hole 325A. The head portion is a plate-shaped portion, and covers the electrolyte solution pouring hole 325A in a state where the head portion overlaps with the lid plate 32. In this embodiment, the head portion has an approximately circular profile as viewed in the Z axis direction.

The insertion portion extending from the head portion passes through the electrolyte solution pouring hole 325A and extends toward the inside of the case 3. That is, the insertion portion is a columnar-shaped portion which extends from the head portion. A size of the insertion portion is slightly larger than a size of the electrolyte solution pouring hole 325A formed in the lid plate 32. Accordingly, when the electrolyte solution pouring plug 326A is mounted on the lid plate 32, the insertion portion is press-fitted in the electrolyte solution pouring hole 325A.

The discharge hole 325B is formed in the case 3. A fluid (a gas such as air, or a liquid such as an electrolyte solution) which is present in the case 3 can be discharged through the discharge hole 325B. The discharge hole 325B has substantially the same configuration as the electrolyte solution pouring hole 325A. That is, the discharge hole 325B makes the inside and the outside of the case 3 communicate with each other. In this embodiment, the discharge hole 325B is formed in the lid plate 32. The discharge hole 325B penetrates the lid plate 32 in the Z axis direction. In this embodiment, the discharge hole 325B is disposed between the gas release vent 321 and the electrolyte solution pouring hole 325A in the X axis direction. To be more specific, the discharge hole 325B is formed at a position corresponding to the guide portion 8 arranged in the inside of the case 3.

The discharge hole 325B having the above-mentioned configuration is hermetically closed (sealed) by the discharge plug 326B thus forming the discharge sealing portion 35B of the case 3. That is, the discharge sealing portion 35B has the discharge hole 325B and the discharge plug 326B. In this embodiment, the discharge plug 326B is fixed to the case 3 (the lid plate 32 in this embodiment) by welding. The discharge plug 326B has substantially the same configuration as the electrolyte solution pouring plug 326A. That is, the discharge plug 326B includes: a plate-shaped head portion which covers the discharge hole 325B; and a columnar-shaped insertion portion which extends from the head portion and is press-fitted in the discharge hole 325B.

The electrode solution sealing portion 35A and the discharge sealing portion 35B (that is, the electrolyte solution pouring hole 325A and the discharge hole 325B) are arranged in the X axis direction with a predetermined distance therebetween. To be more specific, the predetermined distance is a distance by which when a fluid (air or the like) in the inside of the case 3 is discharged through discharge hole 325B in a state where an electrolyte solution is being poured in the case 3 through the electrolyte solution pouring hole 325A, it is possible to prevent the direct discharge (sucking) of the electrolyte solution poured through the electrolyte solution pouring hole 325A from the discharge hole 325B in the guide portion 8.

The guide portion 8 includes the first guide portion 81 and the second guide portion 82, and guides a fluid such as an electrolyte solution in the inside of the case 3. In this embodiment, the guide portion 8 is formed in an elongated rectangular box shape which extends in the X axis direction, and has a space in the inside thereof. The guide portion 8 is arranged between the electrode assembly 2 and the lid plate 32 in the X axis direction. The guide portion 8 overlaps with the electrolyte solution sealing portion 35A and the discharge sealing portion 35B in the Z axis direction. To be more specific, the first guide portion 81 is arranged at a position which overlaps with the electrolyte solution sealing portion 35A (electrolyte solution pouring hole 325A), and the second guide portion 82 is arranged at a position which overlaps with the discharge sealing portion 35B (discharge hole 325B).

Figure 4:
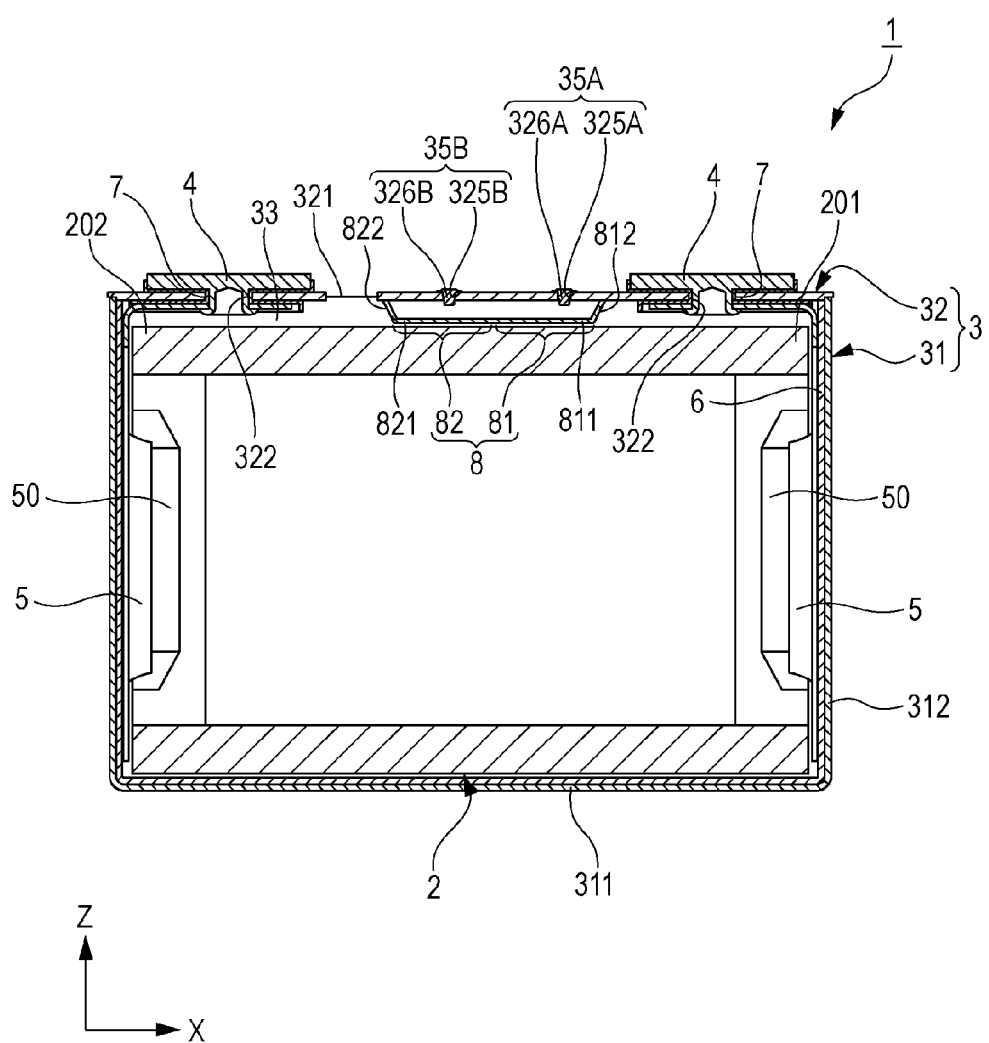
FIG. 4 is a cross-sectional view taken along a line IV-IV in FIG. 1.
Figure 5:
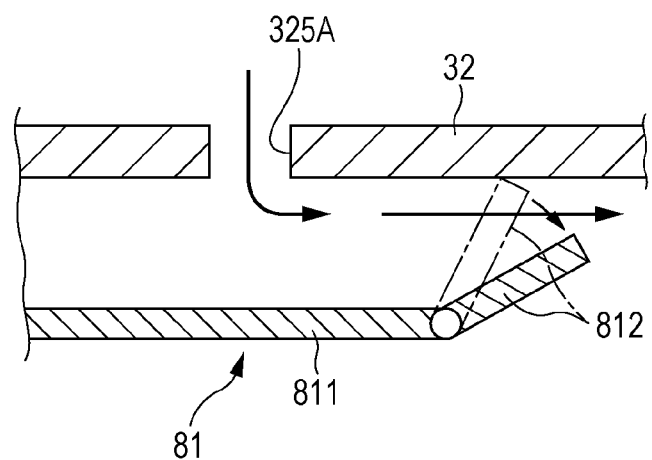
FIG. 5 is an enlarged cross-sectional view of a first guide portion in a state where a first flow control portion is in an open state.
Figure 6:
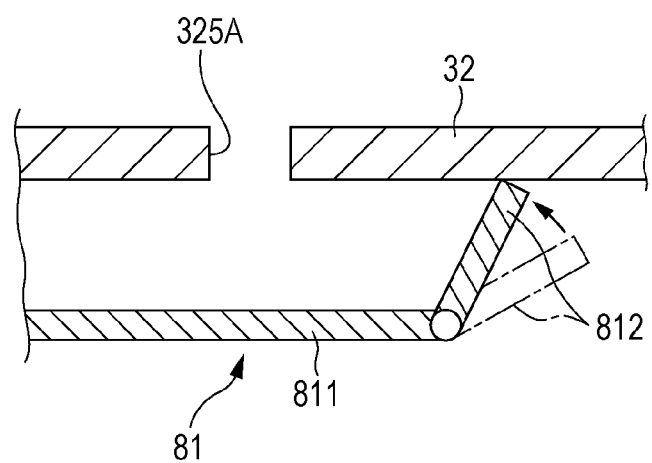
FIG. 6 is an enlarged cross-sectional view of the first guide portion in a state where the first flow control portion is in a closed state.

The first guide portion 81 allows an electrolyte solution to flow toward one end (right end in FIG. 4) 201 of the electrode assembly 2 in the X axis direction from the electrolyte solution pouring hole 325A. To be more specific, as shown in FIG. 4 to FIG. 6, in the inside of the case 3, the first guide portion 81 includes: a first guide body 811 having a cylindrical shape (box shape) which extends toward one end 201 of the electrode assembly 2 from the electrolyte solution pouring hole 325A; and a first flow control portion 812 which controls the outflow and inflow of an electrolyte solution from/into the first guide body 811.

The first guide body 811 extends toward one end 201 of the electrode assembly 2 along an inner surface of the lid plate 32 from the position which overlaps with the electrolyte solution pouring hole 325A in the Z axis direction. The first guide body 811 has, in the inside thereof, a space (flow passage space) capable of forming a flow passage extending toward one end 201 of the electrode assembly 2 from the electrolyte solution pouring hole 325A.

The first flow control portion 812 is mounted on a distal end of the first guide body 811 (an end portion of the first guide body 811 on one end 201 side of the electrode assembly 2). The first flow control portion 812 allows an electrolyte solution to flow toward one end 201 of the electrode assembly 2 from the electrolyte solution pouring hole 325A through the inside (flow passage space) of the first guide body 811 (see FIG. 5). On the other hand, the first flow control portion 812 prevents a fluid from flowing toward the electrolyte solution pouring hole 325A from the inside of the case 3 (to be more specific, an inner space in the case 3 where the electrode assembly 2 is arranged except for the guide portion 8 (hereinafter, simply referred to as "arrangement space")). That is, the first flow control portion 812 prevents a fluid from flowing to the inside of the first guide body 811 from the arrangement space (see FIG. 6). In this embodiment, the first flow control portion 812 is a check valve, for example. In this manner, with the use of the check valve 812, in the first guide portion 81, it is possible to easily provide the configuration where an electrolyte solution is allowed to flow toward one end 201 of the electrode assembly 2 from the electrolyte solution pouring hole 325A, and a fluid is prevented from flowing toward the electrolyte solution pouring hole 325A from the arrangement space.

The second guide portion 82 allows a fluid to flow toward the electrolyte solution pouring hole 325A from the inside of the case 3, and prevents the electrolyte solution from flowing toward the other end 202 of the electrode assembly 2 in the X axis direction from the electrolyte solution pouring hole 325A or minimally allows the electrolyte solution to flow toward the other end 202 of the electrode assembly 2 in the X axis direction from the electrolyte solution pouring hole 325A. To be more specific, in the inside of the case 3, as shown in FIG. 4, FIG. 7 and FIG. 8, the second guide portion 82 includes: a second guide body 821 having a cylindrical shape (box shape) which extends toward the other end 202 of the electrode assembly 2 from the discharge hole 325B; and a second flow control portion 822 which controls the outflow and inflow of an electrolyte solution from/into the second guide body 821.

The second guide body 821 extends toward the other end 202 of the electrode assembly 2 along the inner surface of the lid plate 32 from a position which overlaps with the discharge hole 325B in the Z axis direction. The second guide body 821 has, in the inside thereof, a flow passage space capable of forming a flow passage extending toward the discharge hole 325B from the arrangement space. In the energy storage device 1 of this embodiment, the first guide body 811 and the second guide body 821 are formed into an integral body. That is, the first guide body 811 and the second guide body 821 are continuously connected to each other in the X axis direction thus forming one cylindrical shape (elongated rectangular box shape). Accordingly, the flow passage space of the first guide body 811 and the flow passage space of the second guide body 821 communicate with each other.

Figure 7:
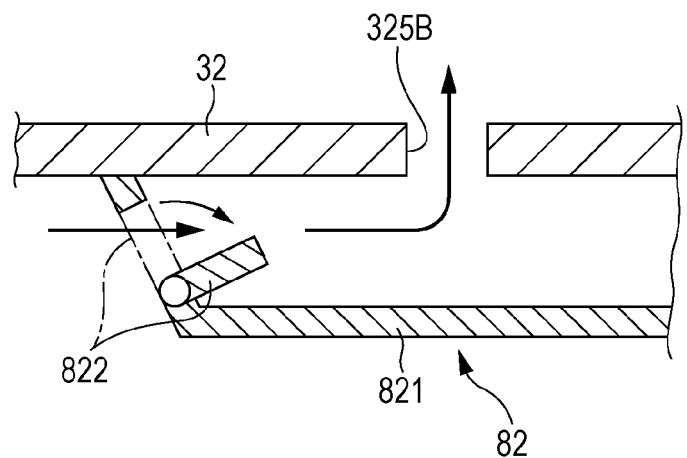
FIG. 7 is an enlarged cross-sectional view of a second guide portion in a state where a second flow control portion is in an open state.
Figure 8:
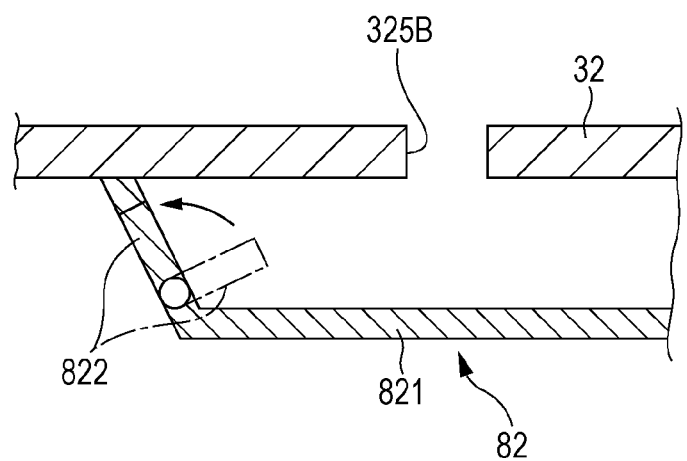
FIG. 8 is an enlarged cross-sectional view of the second guide portion in a state where the second flow control portion is in a closed state.

The second flow control portion 822 is mounted on a distal end of the second guide body 821 (end portion of the second guide body 821 on the other end 202 side of the electrode assembly 2), and allows a fluid to flow toward the electrolyte solution pouring hole 325A from the inside of the case 3, that is, allows a fluid to flow to the inside of the second guide body 821 from the arrangement space (see FIG. 7). On the other hand, the second flow control portion 822 prevents an electrolyte solution from flowing toward the other end 202 of the electrode assembly 2 from the electrolyte solution pouring hole 325A and the discharge hole 325B. That is, the second flow control portion 822 prevents a fluid from flowing to the arrangement space from the inside of the second guide body 821 (see FIG. 8). In this embodiment, the second flow control portion 822 is a check valve, for example. In this manner, by using the check valve, it is possible to easily provide the power storage device having the configuration where, in the second guide portion 82, a fluid is allowed to flow toward the electrolyte solution pouring hole 325A from the arrangement space, and an electrolyte solution is prevented from flowing toward the other end 202 of the electrode assembly 2 through the electrolyte solution pouring hole 325A.

In the guide portion 8 having the above-mentioned configuration, the discharge sealing portion 35B (discharge hole 325B) is arranged at a position closer to the second guide portion 82 than the electrolyte solution sealing portion 35A (electrolyte solution pouring hole 325A) is. Accordingly, in the second guide portion 82, a fluid which is present in the case 3 (to be more specific, in the arrangement space) and flows toward the electrolyte solution pouring hole 325A from the second flow control portion 822 can be discharged more easily through the discharge hole 325B than through the electrolyte solution pouring hole 325A. Accordingly, in the guide portion 8, an electrolyte solution poured through the electrolyte solution pouring hole 325A flows through the first guide portion 81 and is supplied to one end 201 of the electrode assembly 2, and a fluid which is present in the case 3 (to be more specific, in the arrangement space) flows through the second guide portion 82 and can be easily discharged to the outside through the discharge hole 325B.

The external terminal 4 is a portion which is electrically connected to an external terminal of another energy storage device, external equipment or the like. The external terminal 4 is made of a material having conductivity. For example, the external terminal 4 is made of a metal material having high weldability such as an aluminum-based metal material such as aluminum or an aluminum alloy, or a copper-based metal material such as copper or a copper alloy.

The energy storage device 1 includes penetration members 7 which penetrate the case 3. The penetration member 7 makes the current collector 5 arranged in the inside of the case 3 and the external terminal 4 arranged outside the case 3 electrically conductive with each other. The penetration member 7 is made of conductive metal, and extends from the external terminal 4 to the current collector 5. In this embodiment, the penetration member 7 is integrally formed with the external terminal 4. Hermetic sealing is applied to the lid plate 32 with the external terminal 4 and the penetration member 7. That is, the case 3 has the airtight structure except for the electrolyte solution pouring hole 325A and the discharge hole 325B.

The current collectors 5 are arranged in the inside of the case 3, and are directly or indirectly electrically connected with the electrode assembly 2. The current collectors 5 in this embodiment are electrically connected with the electrode assembly 2 by way of clip members 50. The current collector 5 is made of a material having conductivity. As shown in FIG. 4, the current collectors 5 are arranged along the inner surface of the case 3. In this embodiment, the current collector 5 makes the penetration member 7 and the clip member 50 electrically connected with each other. Each of the current collectors 5 is arranged on a positive electrode and a negative electrode of the energy storage device 1. In the energy storage device 1 of this embodiment, each of the current collectors 5 is connected to one end 201 and the other end 202 of the electrode assembly 2 in the inside of the case 3.

The energy storage device 1 includes an insulating member 6 and the like which insulates the electrode assembly 2 and the case 3 from each other. In this embodiment, the insulating member 6 is an insulation cover, for example. The insulation cover 6 is arranged between the case 3 (to be more specific, the case body 31) and the electrode assembly 2. The insulation cover 6 is made of a material having insulation property. The insulation cover 6 is formed of a sheet-like member. In this embodiment, the insulation cover 6 is made of a resin such as polypropylene or polyphenylene sulfide. The insulation cover 6 is formed into a bag shape by bending a sheet-like member which has insulation property and has a predetermined shape by cutting.

Instead of forming the insulation cover 6 into a bag shape by simply bending a sheet-like member, the insulation cover 6 may be formed into a bag shape by fusing or welding a sheet-like member, for example. The insulation cover 6 may be formed into a bag shape from the beginning. The electrode assembly 2 and the case 3 may be insulated from each other by forming an insulation layer on an inner surface of the case 3 instead of using the insulation cover 6.

In the energy storage device 1 of this embodiment, the electrode assembly 2 (to be more specific, the electrode assembly 2 and current collectors 5) in a state of being stored in the bag-shaped insulation cover 6 is stored in the inside of the case 3.

Figure 9:
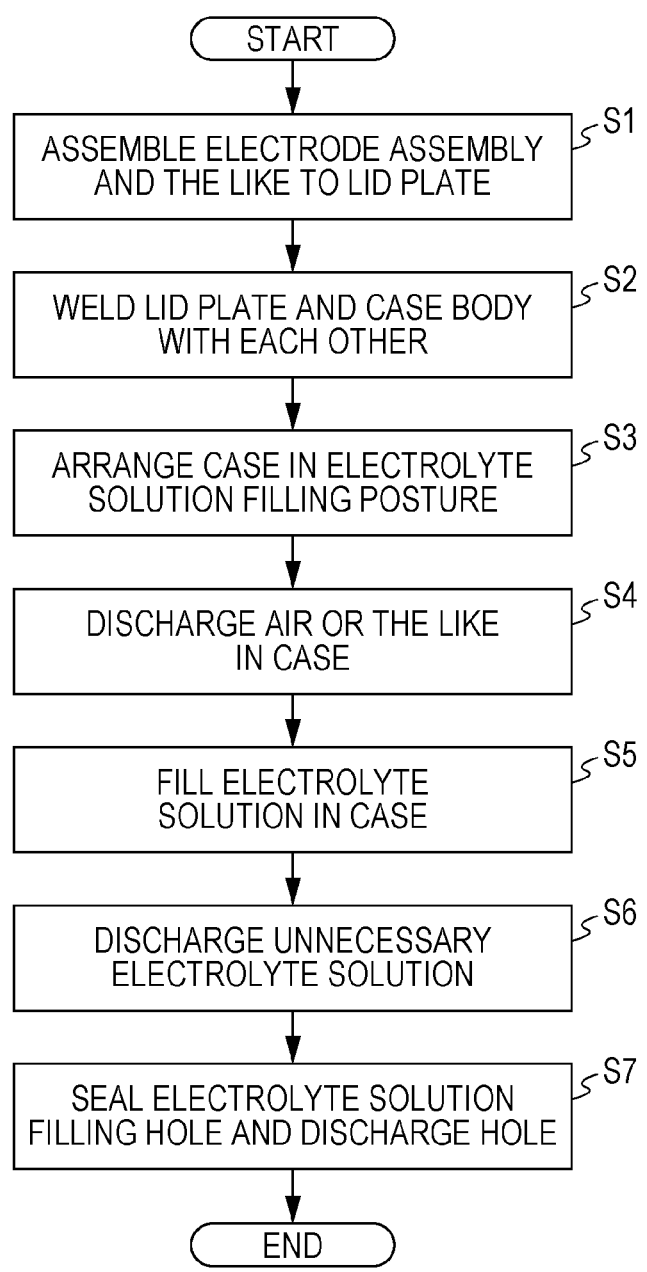
FIG. 9 is a flowchart describing a method of manufacturing an energy storage device according to the embodiment.
Figure 10:
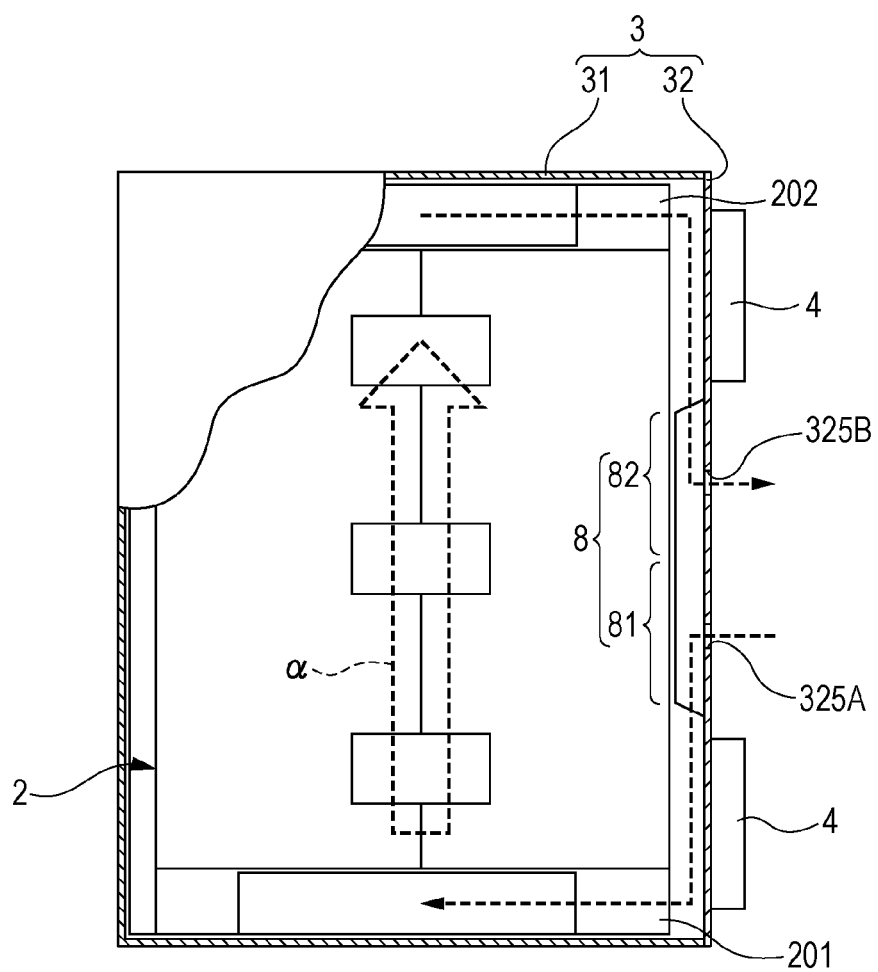
FIG. 10 is a partial cross-sectional view describing a posture of a case at the time of pouring an electrolyte solution, and the direction along which the electrolyte solution moves in the inside of the case.

Next, a method of manufacturing the energy storage device 1 having the above-mentioned configuration is described also by reference to FIG. 9 and FIG. 10.

The external terminals 4, the current collectors 5, the electrode assembly 2, the insulation cover 6, the guide portion 8 and the like are assembled to the lid plate 32 (step S1). At this stage of the operation, the lid plate 32 is in a state where the electrolyte solution pouring plug 326A is not mounted in the electrolyte solution pouring hole 325A, and the discharge plug 326B is not mounted in the discharge hole 325B. That is, the electrolyte solution pouring hole 325A is not sealed in the electrolyte solution sealing portion 35A of the case 3, and the discharge hole 325B is not sealed in the discharge sealing portion 35B of the case 3.

The assembled electrode assembly 2 and the like are stored in the case body 31, and the peripheral portion of the lid plate 32 is made to overlap with the opening peripheral portion of the case body 31 such that the lid plate 32 closes the opening of the case body 31. In such a state, a boundary portion between the lid plate 32 and the case body 31 is welded (step S2).

Next, the case 3 is brought into a posture where the electrolyte solution pouring hole 325A is positioned below the discharge hole 325B, and an electrolyte solution is poured in the case 3 through the electrolyte solution pouring hole 325A. To be more specific, an electrolyte solution is poured in the case 3 as follows.

Firstly, as shown in FIG. 10, the case 3 is brought into a posture (electrolyte solution pouring posture) where the electrolyte solution pouring hole 325A is positioned below the discharge hole 325B and the winding axis direction (X axis direction) of the electrode assembly 2 is directed in the vertical direction (the direction of gravity) (step S3). Subsequently, in a state where air or the like does not flow into the inside of the case 3 through the electrolyte solution pouring hole 325A, a fluid (air or the like) which is present in the inside of the case 3 is discharged through the discharge hole 325B such that the inside of the case 3 is brought into a low pressure state (step S4). Here, in the guide portion 8, as shown in FIG. 7, the second flow control portion (check valve) 822 is opened so that a fluid which is present in the arrangement space is guided to the discharge hole 325B by the second guide portion 82. On the other hand, as shown in FIG. 6, the first flow control portion (check portion) 812 is closed so that a fluid which is present in the arrangement space is prevented from flowing to the first guide portion 81. Here, the inside of the case 3 being in a low pressure state means that a pressure in the case 3 is smaller than an atmospheric pressure (1 atmospheric pressure). From a viewpoint that an electrolyte solution is liable to be sucked into the inside of the case 3 at the time of pouring the electrolyte solution, a pressure in the inside of the case 3 is preferably set to an atmospheric pressure of 0.1 or below, and is more preferably set to an atmospheric pressure of 0.01 or below.

When the inside of the case 3 is brought into a low pressure state, an electrolyte solution is poured into the inside of the case 3 through the electrolyte solution pouring hole 325A (step S5). Here, in the guide portion 8, the first guide portion 81 guides the electrolyte solution poured through the electrolyte solution pouring hole 325A toward one end 201 of the electrode assembly 2, and the second guide portion 82 prevents the poured electrolyte solution from flowing toward the other end 202 of the electrode assembly 2. That is, in the guide portion 8, as shown in FIG. 5, the first flow control portion 812 is opened, and the first guide portion 81 allows the poured electrolyte solution to flow toward one end 201 of the electrode assembly 2. On the other hand, as shown in FIG. 8, the second flow control portion 822 is closed so that the second guide portion 82 obstructs (prevents) the electrolyte solution poured through the electrolyte solution pouring hole 325A from flowing toward the other end 202 of the electrode assembly 2.

In this manner, when an electrolyte solution is poured in a state where the inside of the case 3 is brought into a low pressure state, in the inside of the case 3, the electrolyte solution poured in the inside of the case 3 through the electrolyte solution pouring hole 325A is guided toward one end 201 of the electrode assembly 2 by the first guide portion 81, and the electrolyte solution is prevented from flowing toward the other end 202 of the electrode assembly 2 by the second guide portion 82. Accordingly, one end 201 of the electrode assembly 2 can be easily brought into contact with the poured electrolyte solution compared with the other end 202 of the electrode assembly 2. With this configuration, at the time of manufacturing the energy storage device 1 (at the time of pouring an electrolyte solution), the electrolyte solution impregnates into the inside of the electrode assembly 2 from one end 201 of the electrode assembly 2 (to be more specific, open end 203: see FIG. 3), and the electrolyte solution impregnates into the inside of the whole electrode assembly 2 from the one end 201 toward the other end 202 of the electrode assembly 2 (see an arrow a in FIG. 10). With this configuration, a gas which is present between the electrodes (the positive electrode 23 and the negative electrode 24) and the separator 25 before an electrolyte solution is poured in the case 3 is discharged from the other end 202 of the electrode assembly 2 such that the gas is pushed out by the impregnated electrolyte solution. As a result, the gas minimally remains in the inside of the electrode assembly 2 when the electrolyte solution impregnates into the whole electrode assembly 2. Here, the gas discharged through the other end 202 of the electrode assembly 2 is discharged through the discharge hole 325B along the second guide portion 82. The open end 203 is a portion of the electrode assembly 2 which constitutes an inlet through which an electrolyte solution infiltrates into spaces formed between the layered electrodes (the positive electrode 23 and the negative electrode 24) and the separator 25. As shown in FIG. 3, in this embodiment, the open end 203 of the electrode assembly 2 on one end 201 side is a portion of the electrode assembly 2 which is positioned at one edge in the width direction of a portion where the positive electrode 23 and the negative electrode 24 overlap (are layered) with each other in the electrode assembly 2 where the positive electrode 23 and the negative electrode 24 are layered to each other with the separator 25 interposed therebetween in a state where the positive electrode 23 and the negative electrode 24 are positionally displaced from each other in the width direction. To be more specific, the open end 203 on one end 201 side is a portion of the electrode assembly 2 positioned on one edge of the coated portion 232 of the positive electrode 23 (an edge on a side opposite to the non-coated portion 231). On the other hand, the open end 204 of the electrode assembly 2 on the other end 202 side is a portion of electrode assembly 2 which is positioned at the other edge in the width direction of the portion where the positive electrode 23 and the negative electrode 24 overlap with each other (an edge on a side opposite to the open end 203 on one end 201). The open end 204 of the electrode assembly 2 on the other end 202 side is a portion which constitutes an outlet through which a gas (air or the like) which is present between the electrodes (the positive electrode 23 and the negative electrode 24) and the separator 25 is discharged at the time of pouring of the electrolyte solution. To be more specific, the open end 204 on the other end 202 side is a portion of the electrode assembly 2 which is positioned on the other edge of the coated portion 232 of the positive electrode 23 (the edge arranged adjacent to the non-coated portion 231).

In this embodiment, the discharging of a fluid through the discharge hole 325B is stopped at the time of pouring an electrolyte solution into the inside of the case 3 (step S5). However, the discharging of the fluid through the discharge hole 325B may be continued at the time of pouring an electrolyte solution into the inside of the case 3 (step S5).

When the electrolyte solution sufficiently impregnates into the electrode assembly 2 after a lapse of a predetermined time from starting the pouring of the electrolyte solution in the case 3, when necessary, an unnecessary electrolyte solution (a part of the poured electrolyte solution) is discharged through the discharge hole 325B while flowing through the second guide portion 82 (step S6).

When the unnecessary electrolyte solution is discharged, the electrolyte solution pouring hole 325A is sealed by the electrolyte solution pouring plug 326A and, at the same time, the discharge hole 325B is sealed by the discharge plug 326B (step S7). Through these steps, the energy storage device 1 is completed.

According to the above-mentioned energy storage device 1 and a method of manufacturing the energy storage device 1, by the first guide portion 81 and the second guide portion 82, an electrolyte solution poured in the inside of the case 3 through the electrolyte solution pouring hole 325A is guided toward one end 201 of the electrode assembly 2, and the electrolyte solution is prevented from flowing toward the other end 202 of the electrode assembly 2. Therefore, one end 201 of the electrode assembly 2 can be easily brought into contact with the poured electrolyte solution compared with the other end 202 of the electrode assembly 2. Accordingly, at the time of manufacturing the energy storage device 1 (at the time of pouring an electrolyte solution), the electrolyte solution can easily impregnate (infiltrate) into the inside of the electrode assembly 2 from one end 201 of the electrode assembly 2. As a result, as described above, a gas which is present between the electrodes (the positive electrode 23 and the negative electrode 24) and the separator 25 before the pouring of the electrolyte solution is discharged from the other end 202 of the electrode assembly 2 such that the gas is pushed out by the impregnated electrolyte solution. Accordingly, the gas minimally remains in the inside of the electrode assembly 2 when the electrolyte solution impregnates into the inside of the whole electrode assembly 2. In this manner, it is possible to obtain the energy storage device 1 where the impregnation of an electrolyte solution to the inside of the electrode assembly 2 minimally becomes non-uniform.

In the method of manufacturing the energy storage device 1 of this embodiment, at the time of pouring an electrolyte solution, the electrolyte solution is poured in the case 3 with the case 3 held in a posture where the X axis direction (winding axis direction) of the electrode assembly 2 is directed in the vertical direction. Here, the electrolyte solution is poured in the case 3 held in a posture where the position in the inside of the case 3 to which the electrolyte solution is guided (one end 201 of the electrode assembly 2) constitutes a lower end of the case 3 and one end 201 of the electrode assembly 2 is directed downward. Accordingly, the whole one end 201 of the electrode assembly 2 in the Z axis direction can be easily brought into contact with an electrolyte solution and hence, it is possible to make an electrolyte solution efficiently impregnate into the inside of the electrode assembly 2.

In the method of manufacturing the energy storage device 1 of this embodiment, the inside of the case 3 is in a low pressure state when an electrolyte solution is poured in the case 3 and hence, the electrolyte solution is sucked into the inside of the case 3 during the pouring of the electrolyte solution whereby the electrolyte solution can be easily poured in the inside of the case 3.

It is needless to say that the energy storage device of the present invention is not limited to the above-mentioned embodiment, and various modifications are conceivable without departing from the gist of the present invention. For example, the configuration of another embodiment may be added to the configuration of one embodiment. Alternatively, a part of the configuration of one embodiment may be replaced with the configuration of another embodiment. Further, a part of the configuration of one embodiment may be omitted.

In the above-mentioned embodiment, the guide portion 8 is configured such that the inside (flow passage space) of the first guide body 811 and the inside (flow passage space) of the second guide body 821 communicate with each other. However, the guide portion 8 is not limited to such a configuration. For example, the guide portion 8 may include a partition portion which partitions the flow passage space of the first guide body 811 and the flow passage space of the second guide body 821 from each other. With this configuration, it is possible to surely prevent an electrolyte solution poured through the electrolyte solution pouring hole 325A from being discharged through the discharge hole 325B without flowing through the arrangement space.

In the above-mentioned embodiment, the first guide portion 81 and the second guide portion 82 are formed into an integral body. However, the first guide portion 81 and the second guide portion 82 may be separate bodies from each other. With this configuration, the electrolyte solution sealing portion 35A and the discharge sealing portion 35B may not be arranged close to each other and hence, the degree of freedom in the arrangement of the electrolyte solution sealing portion 35A and the discharge sealing portion 35B is enhanced.

Figure 11:
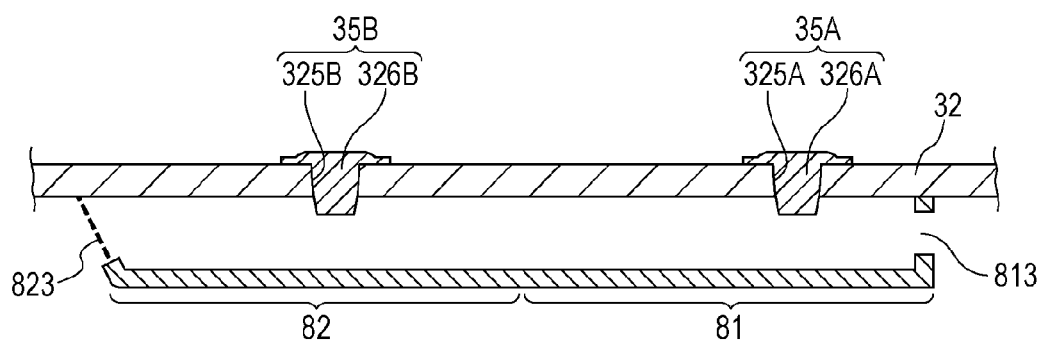
FIG. 11 is an enlarged cross-sectional view of a guide portion in an energy storage device according to another embodiment.
Figure 12:
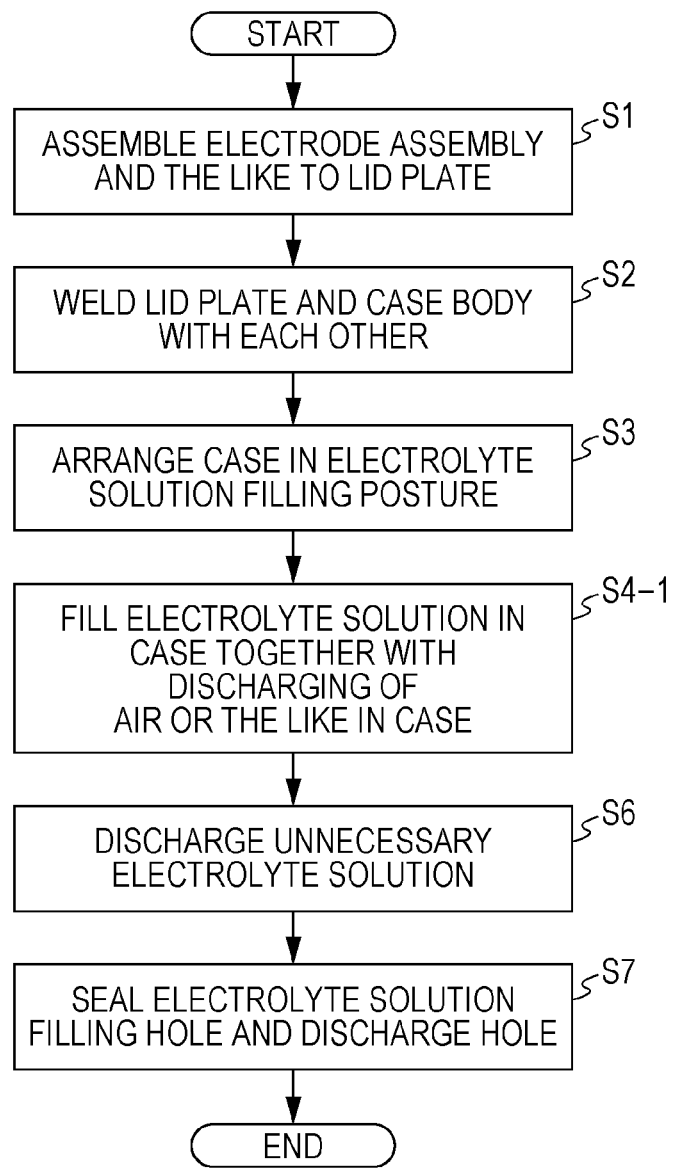
FIG. 12 is a flowchart describing a method of manufacturing an energy storage apparatus according to another embodiment.

The specific configuration of the first flow control portion 812 is not particularly limited. In the above-mentioned embodiment, the first flow control portion 812 is a check valve. However, provided that the first flow control portion 812 has the configuration which allows an electrolyte solution to flow (flow out) toward the arrangement space from the inside of first guide portion 81, the first flow control portion 812 may adopt other configurations. For example, as shown in FIG. 11, the first flow control portion 813 may be a simple opening.

The specific configuration of the second flow control portion 822 is not particularly limited. In the above-mentioned embodiment, the second flow control portion 822 is a check valve. However, provided that the second flow control portion 822 has the configuration which allows a fluid to flow toward the inside of the second guide portion 82 from the arrangement space and can prevent a fluid from flowing (flowing out) toward the arrangement space from the inside of second guide portion 82, the second flow control portion 822 may adopt other configurations.

The second flow control portion 822 may adopt the configuration where a gas can easily flow into the inside of the second guide portion 82 from the arrangement space and an electrolyte solution is minimally allowed to flow toward the arrangement space from the inside of second guide portion 82. For example, to be more specific, as shown in FIG. 11, the second flow control portion 823 may be a mesh member which is arranged so as to intersect with a flow passage of a fluid which flows into the inside of the second guide body 821 (a flow passage of a fluid which flows toward the electrolyte solution pouring hole 325A from the inside of the case 3). Viscosity of a liquid is higher than viscosity of a gas and hence, it is more difficult for a liquid to pass through the mesh member than for a gas. Accordingly, with the above-mentioned configuration, it is possible to provide the power storage device having the configuration where, using a simple configurational member, a gas such as air can easily flow toward the inside of the second guide portion 82 from the arrangement space, and a liquid such as an electrolyte solution is minimally allowed to flow toward the arrangement space from the inside of second guide portion 82 (toward the other end 202 of the electrode assembly 2 from the electrolyte solution pouring hole 325A). Accordingly, in the second guide portion 82, the electrolyte solution poured in the inside of the case 3 is guided toward one end 201 of the electrode assembly 2 from the electrolyte solution pouring hole 325A, and the electrolyte solution is minimally allowed to flow toward the other end 202 of the electrode assembly 2. Accordingly, one end 201 of the electrode assembly 2 can be easily brought into contact with the poured electrolyte solution compared with the other end 202 of the electrode assembly 2.

In the method of manufacturing the energy storage device 1 of the above-mentioned embodiment, the case 3 takes the electrolyte solution pouring posture where the X axis direction (winding axis direction) of the electrode assembly 2 is directed in the vertical direction. However, the case 3 is not limited to such an electrolyte solution pouring posture. It is sufficient for the case 3 to take an electrolyte solution pouring posture where the electrolyte solution pouring hole 325A is positioned below the discharge hole 325B. By adopting such an electrolyte solution pouring posture, one end 201 of the electrode assembly 2 is positioned below the other end 202 of the electrode assembly 2 and hence, an electrolyte solution guided by the first guide portion 81 easily flows to an area in the vicinity of one end 201 of the electrode assembly 2 in the inside of the case 3 due to the gravity, and the electrolyte solution guided by the first guide portion 81 is minimally allowed to flow toward the other end 202 of the electrode assembly 2. As a result, it is possible to make an electrolyte solution efficiently impregnate into the inside of the electrode assembly 2 from one end 201 of the electrode assembly 2.

In the above-mentioned embodiment, an electrolyte solution is poured in the inside of the case 3 after a fluid (air or the like) is discharged from the inside of the case 3 (see step S4 in the above-mentioned embodiment) so that a pressure in the inside of the case 3 is reduced (see step S5 in the above-mentioned embodiment). However, as shown in 12, discharging of a gas which is present in the inside of the case 3 through the discharge hole 325B and pouring of an electrolyte solution in the case 3 through the electrolyte solution pouring hole 325A may be simultaneously performed (step S4-1). In such a case, steps S1 to S3, S6 and S7 are performed in the same manner as the above-mentioned embodiment. Also with this configuration, the inside of the case 3 can be held in a low pressure state at the time of pouring an electrolyte solution.

Although the electrolyte solution pouring hole 325A and the discharge hole 325B are formed in the case 3 of the above-mentioned embodiment, the present invention is not limited to such a configuration. The discharge hole 325B may not be formed in the case 3 and all portions of the case 3 except for the electrolyte solution pouring hole 325A may have the airtight structure. In this case, the inside of the case 3 is brought into a low pressure state (see step S4 in the above-mentioned embodiment) by discharging a gas through the electrolyte solution pouring hole 325A. With this configuration, it is no more necessary to provide the discharge hole 325B for bringing the inside of the case 3 into a low pressure state by discharging a fluid such as a gas and a member for sealing the discharge hole 325B and the like and hence, the configuration of the case 3 can be simplified, and it is possible to omit an operation of sealing the discharge hole after discharging a fluid.

Although the electrode assembly 2 does not include a winding core in the above-mentioned embodiment, the present invention is not limited to such a configuration. The electrode assembly 2 may include a winding core. In this case, the electrode assembly 2 is formed by winding a positive electrode 23, a negative electrode 24, and a separator 25 around the winding core in a layered state.

In the above-mentioned embodiment, the description has been made with respect to the case where the energy storage device is the chargeable/dischargeable nonaqueous electrolyte secondary battery (for example, lithium ion secondary battery). However, a type and a size (capacities) of an energy storage device can be desirably selected. Further, in the above-mentioned embodiment, the description has been made with respect to the lithium ion secondary battery as one example of the energy storage device. However, the present invention is not limited to the lithium ion secondary battery. For example, the present invention is also applicable to various secondary batteries, primary batteries, and energy storage devices of capacitors such as electric double layer capacitors.

Figure 13:
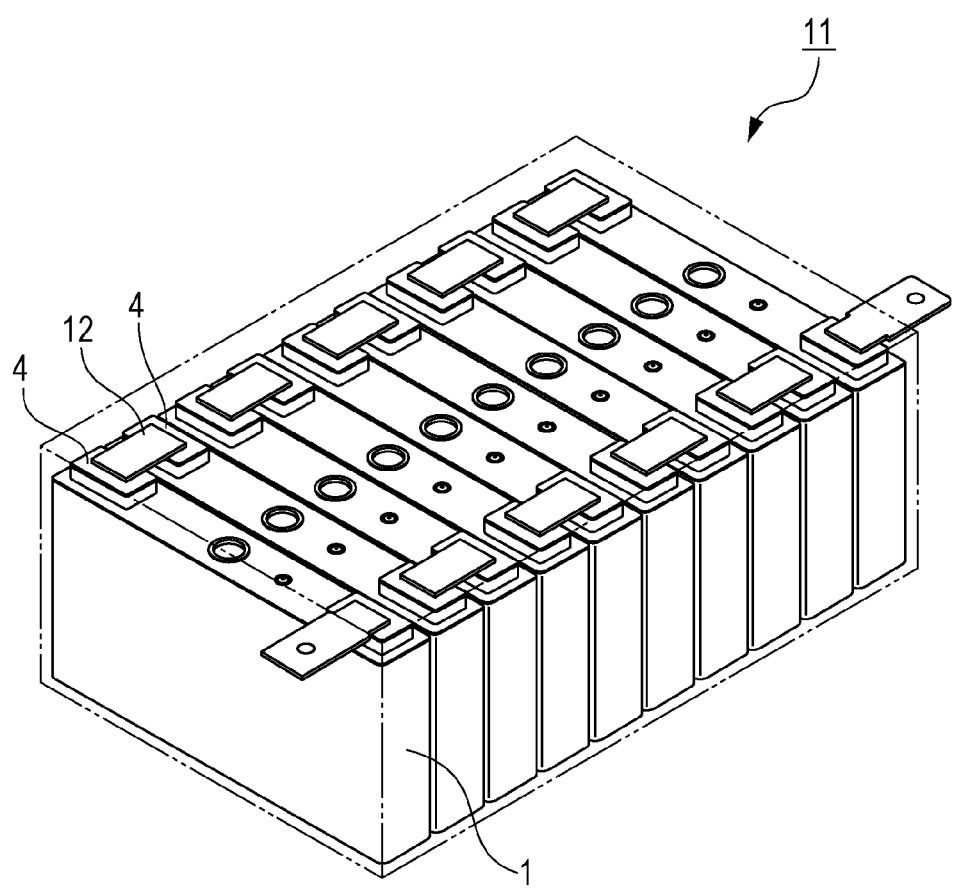
FIG. 13 is a perspective view of an energy storage apparatus including the energy storage devices according to the embodiment.

The energy storage device (for example, battery) may be used in an energy storage apparatus (a battery module when an energy storage device is a battery) 11 shown in FIG. 13. The energy storage apparatus 11 includes at least two energy storage devices 1 and a bus bar member 12 which electrically connects two (different) energy storage devices 1 with each other. In this case, it is sufficient that the technique of the present invention is applied to at least one of the two energy storage devices 1.

An energy storage device where the impregnation of an electrolyte solution to the inside of an electrode assembly minimally becomes non-uniform and a method of manufacturing such an energy storage device according to another embodiment are described hereinafter.

Figure 14:
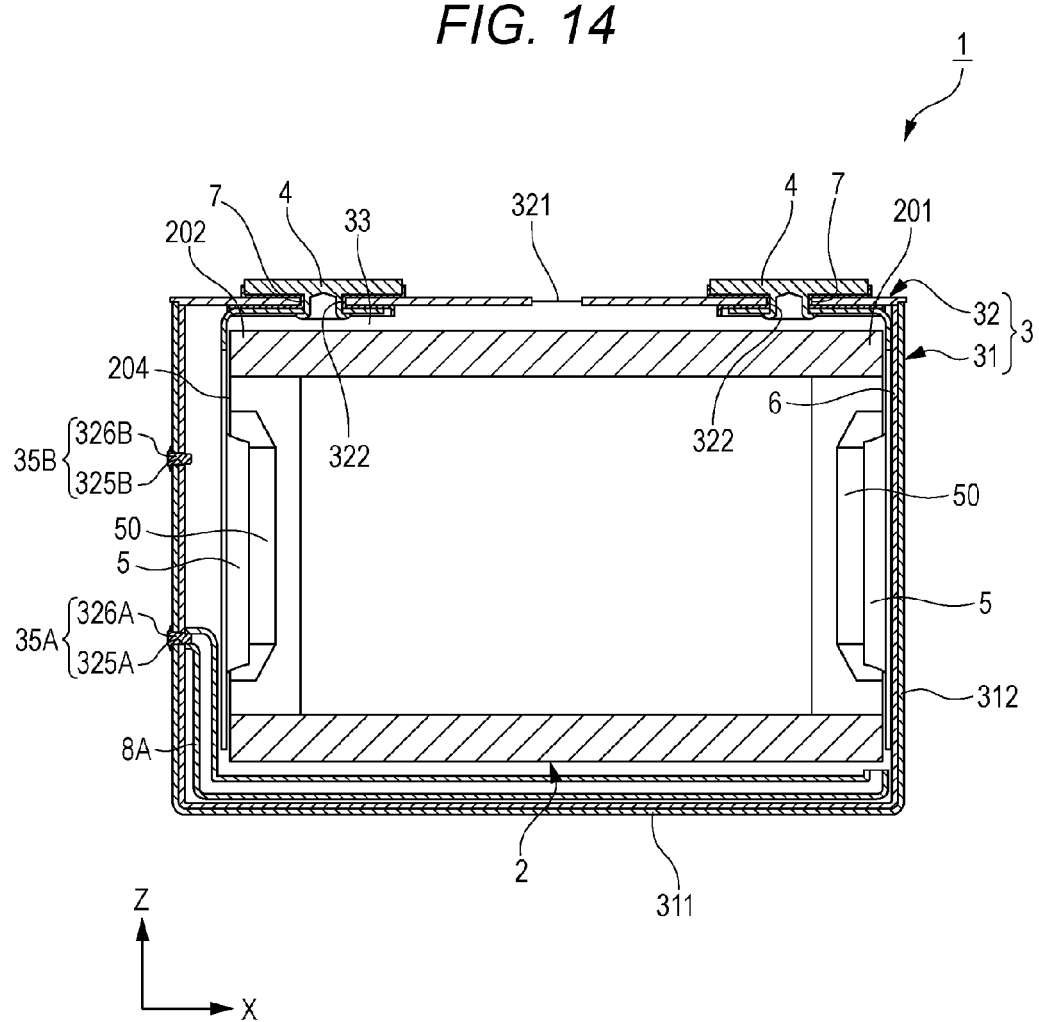
FIG. 14 is a longitudinal cross-sectional view of an energy storage device according to another embodiment of the present invention.

Next, an energy storage device and a method of manufacturing the energy storage device according to a second embodiment of the present invention are described with reference to FIG. 14. Configurational parts of the energy storage device of the second embodiment identical to configurational parts of the energy storage device according to the above-mentioned first embodiment are given the same symbols, and the detailed description of such configurational parts is omitted. Only configurational parts of the energy storage device of the second embodiment which differ from the configurational parts of the energy storage device of the first embodiment are described in detail.

An energy storage device 1A includes: an electrode assembly 2; a case 3 for storing the electrode assembly 2 therein; a guide portion 8A which guides an electrolyte solution to one end 201 of the electrode assembly 2 in the X axis direction (winding axis direction) in the inside of the case 3; external terminals 4 which are arranged outside the case 3; and current collectors 5 which electrically connect the electrode assembly 2 and the external terminals 4 with each other.

A gap for arranging a guide portion 8A (to be more specific, a portion of the guide portion) is formed between the other end 202 of the electrode assembly 2 and a portion of a case body 31 (barrel portion 312) which faces the other end 201. A gap for arranging the guide portion 8A (to be more specific, a portion of the guide portion) is also formed between the electrode assembly 2 and a closed portion 311.

A first sealing portion 35A and a second sealing portion 35B are provided to the case 3 at positions which face the other end (an end portion on a side opposite to one end 201 in the X axis direction) 202 of the electrode assembly 2 respectively. That is, an electrolyte solution pouring hole 325A and a discharge hole 325B are formed in the case 3 (the case body 31 in this embodiment, to be more specific, the barrel portion 312) at positions which face the other end 202 of the electrode assembly 2 respectively. In this embodiment, the first sealing portion 35A is formed at a position closer to the closed portion 311 than the second sealing portion 35B is.

The guide portion 8A guides an electrolyte solution to a position beyond the other end 202 of the electrode assembly 2 in the X axis direction from the electrolyte solution pouring hole 325A. In this embodiment, the guide portion 8A has a cylindrical shape and, in the inside of the case 3, extends from the electrolyte solution pouring hole 325A to one end 201 of the electrode assembly 2 or to a position beyond the one end 201. The guide portion 8A is arranged in the space formed between the electrode assembly 2 and the case 3. To be more specific, the guide portion 8A extends from the electrolyte solution pouring hole 325A to the closed portion 311 along an inner surface of the barrel portion 312, and extends from a distal end of the closed portion 311 to a portion of the inner surface of the barrel portion 312 which faces one end 201 of the electrode assembly 2 along an inner surface of the closed portion 311. In this embodiment, the guide portion is formed of a tube made of a resin such as polyethylene or polypropylene.

Figure 15:
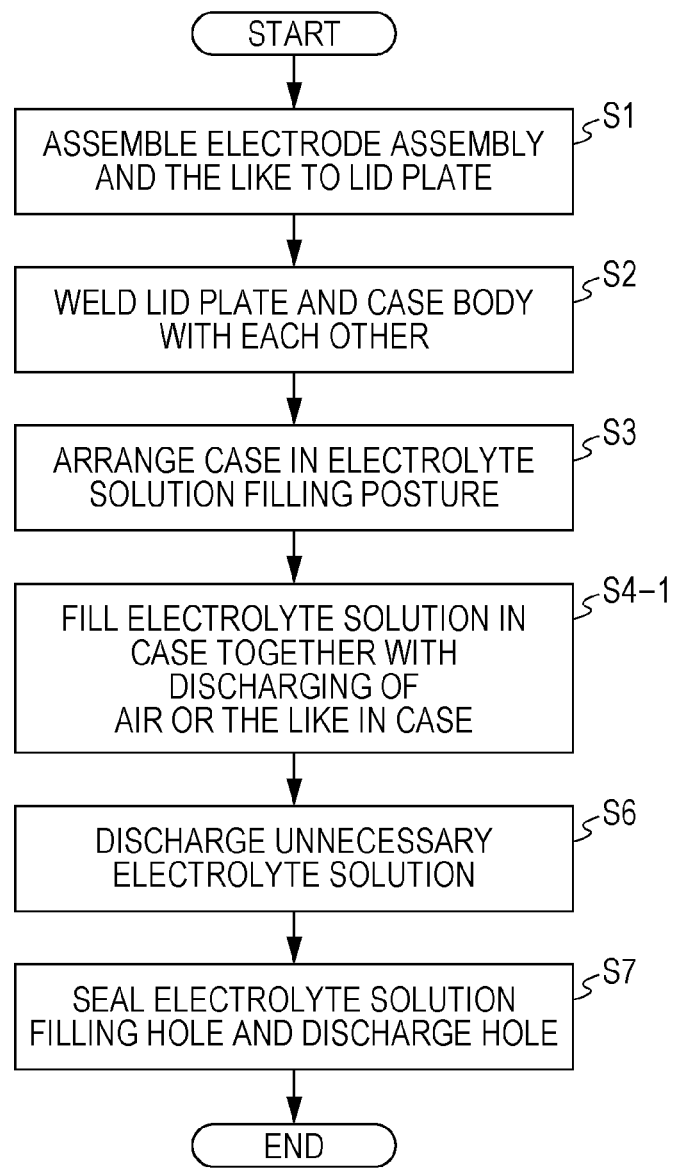
FIG. 15 is a flowchart describing a method of manufacturing an energy storage device according to the embodiment.
Figure 16:
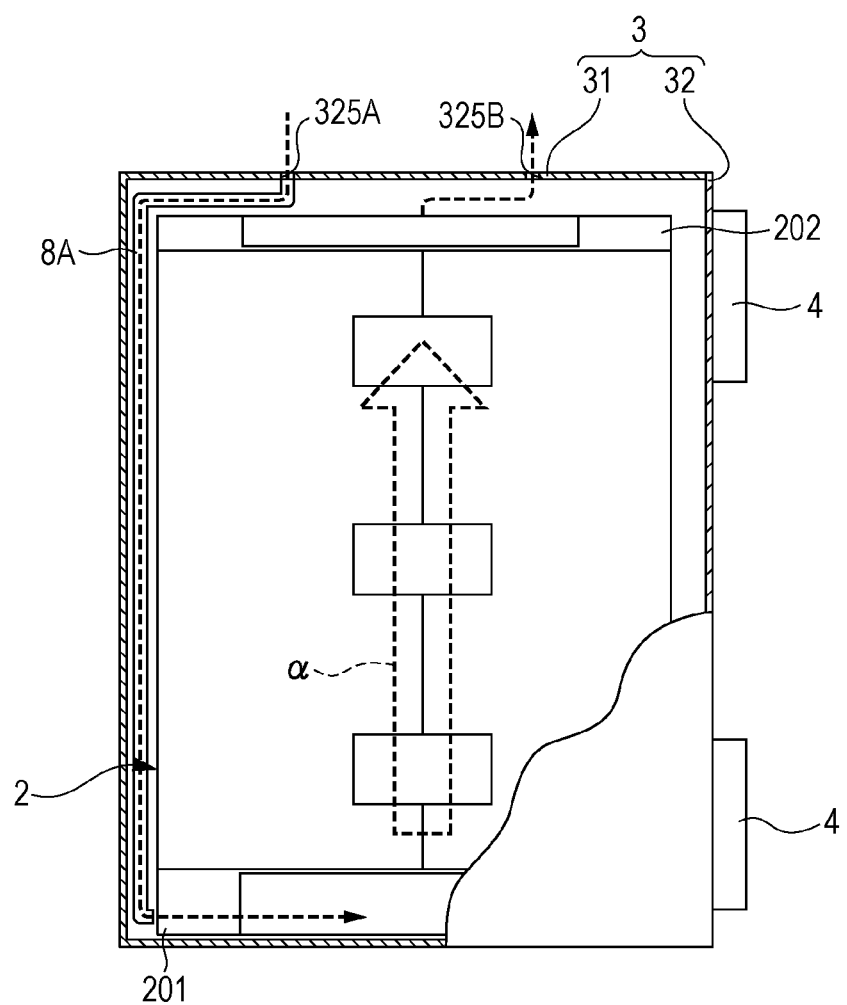
FIG. 16 is a partial cross-sectional view describing a posture of a case at the time of pouring an electrolyte solution, and the direction along which the electrolyte solution moves in the inside of the case in the method of manufacturing an energy storage device.

Next, a method of manufacturing the energy storage device 1A having the above-mentioned configuration is described also by reference to FIG. 15 and FIG. 16.

The external terminals 4, the current collectors 5, the electrode assembly 2, an insulation cover 6, the guide portion 8A and the like are assembled to a lid plate (step S1). The assembled electrode assembly 2, guide portion 8A and the like are stored in the case body 31, and the lid plate 32 is made to overlap with an opening peripheral portion of the case body 31 such that the lid plate 32 closes an opening of the case body 31. In such a state, a boundary portion between the lid plate 32 and the case body 31 is welded (step S2).

Next, as shown in 16, the case 3 is brought into a posture (electrolyte solution pouring posture) where one end 201 of the electrode assembly 2 is positioned below the other end 202 of the electrode assembly 2 and the X axis direction of the electrode assembly 2 is directed in the vertical direction (the direction of gravity) (step S3).

Subsequently, an electrolyte solution is poured in the inside of the case 3 through the electrolyte solution pouring hole 325A, and a fluid such as air or a gas in the inside of the case 3 is discharged through the discharge hole 325B along with such a solution pouring operation (step S4-1). At the time of pouring the electrolyte solution, the electrolyte solution is poured such that a liquid level (a meniscus level) of the electrolyte solution rises to the position of the other end 202 of the electrode assembly 2, or to the position above the other end 202 (to be more specific, the position above active material layers of respective electrodes 23, 24). In this case, the electrolyte solution is poured such that the liquid level gradually rises. Due to such a solution pouring operation, a gas which is present between the electrodes 23, 24 and a separator 25 before the pouring of the electrolyte solution is pushed out to the other end 202 side by the electrolyte solution which is impregnated into the inside of the electrode assembly 2. In addition to such an operation, the gas is pushed out to the other end 202 side also due to a rise of an upper end position at which a force (water pressure) is applied to the electrode assembly 2 from the periphery by the electrolyte solution accumulated in the case 3 by a rise of the liquid level.

The discharging of a fluid (the discharging of a gas in this embodiment) through the discharge hole 325B may be natural discharging or forced discharging which brings the inside of the case 3 into a low pressure state.

When the electrolyte solution sufficiently impregnates into the electrode assembly 2 after a lapse of a predetermined time from starting the pouring of the electrolyte solution in the case 3, when necessary, an unnecessary electrolyte solution (a part of the poured electrolyte solution) is discharged through the discharge hole 325B (step S6).

When the unnecessary electrolyte solution is discharged, the electrolyte solution pouring hole 325A is sealed by the electrolyte solution pouring plug 326A and, at the same time, the discharge hole 325B is sealed by the discharge plug 326B (step S7). Through these steps, the energy storage device 1 is completed.

Also by the above-mentioned energy storage device 1A and the method of manufacturing the energy storage device 1A, a poured electrolyte solution flows away from the discharge hole 325B and is guided toward one end 201 of the electrode assembly 2 by the guide portion 8A. Accordingly, the electrolyte solution is efficiently supplied to one end 201 of the electrode assembly 2 without leaking from the discharge hole 325B and hence, one end 201 of the electrode assembly 2 can be easily brought into contact with the poured electrolyte solution compared with the other end 202 of the electrode assembly 2. As a result, at the time of pouring an electrolyte solution, the electrolyte solution can easily impregnate (infiltrate) into the inside of the electrode assembly 2 from one end 201 of the electrode assembly 2 and hence, it is possible to prevent that the impregnation of an electrolyte solution into the inside of the electrode assembly 2 becomes non-uniform.

Further, the discharge hole 325B is formed in the case 3 and hence, when an electrolyte solution is poured in the inside of the case 3 through the electrolyte solution pouring hole 325A, a fluid (air or the like) which is present in the case 3 is discharged to the outside through the discharge hole 325B. Accordingly, it is possible to prevent that an internal pressure of the case 3 is increased due to the pouring of an electrolyte solution so that the pouring of the electrolyte solution is minimally allowed. As a result, an electrolyte solution can efficiently impregnate into the electrode assembly 2 from one end 201 of the electrode assembly 2.

Further, at the time of pouring an electrolyte solution, the electrolyte solution is poured until a liquid level of the electrolyte solution is positioned at the other end 201 of the electrode assembly 2, or at the position above the other end 201 of the electrode assembly 2 and hence, the liquid level of the electrolyte solution is gradually elevated toward the other end (upper end) 202 of the electrode assembly 2 from one end (lower end) 201 of the electrode assembly 2, and the whole electrode assembly 2 is brought into an immersed state. Accordingly, a gas which is present between the electrodes and the separator before the pouring of the electrolyte solution can be surely pushed out from the other end 202 of the electrode assembly 2. Further, the liquid level is elevated until the whole electrode assembly 2 is immersed into the electrolyte solution and hence, it is possible to make a sufficient amount of electrolyte solution impregnate into the electrode assembly 2.

Figure 17:
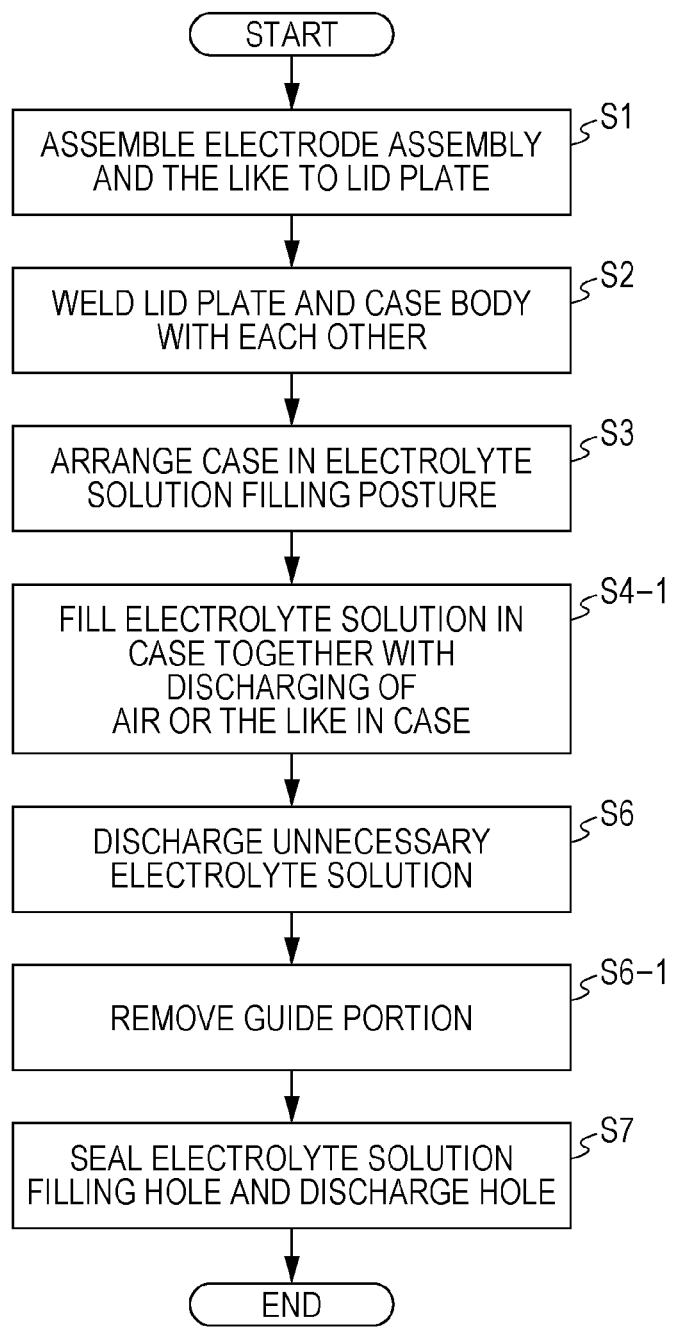
FIG. 17 is a flowchart describing a method of manufacturing an energy storage device according to another embodiment.

For example, after an unnecessary electrolyte solution is discharged from the inside of the case 3, the guide portion 8A may be removed from the inside of the case 3. That is, in the method of manufacturing the energy storage device 1A, as shown in FIG. 17, the guide portion 8A may be removed from the inside of the case 3 (step S6-1). To be more specific, after the unnecessary electrolyte solution is removed from the case 3, the guide portion (resin-made tube) 8A is pulled out from the electrolyte solution pouring hole 325A. In the second embodiment, the guide portion 8A is formed of a resin-made tube and hence, the guide portion 8A can be easily deformed. Accordingly, after pouring the electrolyte solution, the guide portion 8A can be removed from the inside of the case 3 by pulling out the guide portion 8A from the electrolyte solution pouring hole 325A. In this manner, by enabling the removal of the guide portion 8A from the inside of the case 3 in steps of manufacturing the energy storage device 1A, it is no more necessary to provide the guide portion 8A with a countermeasure against vibrations generated at the time of using the energy storage device 1A or the like. That is, energy storage device 1A can adopt the guide portion 8A having the simple configuration.

The specific arrangement of the tube-shaped (cylindrical) guide portion 8A is not particularly limited. In the above-mentioned embodiment, the guide portion 8A is arranged along the closed portion 311. However, for example, the guide portion 8A may be arranged so as to straightly extend in the X axis direction from the electrolyte solution pouring hole 325A, or may be arranged along the lid plate 32. Whichever arrangement is adopted, when an electrolyte solution is poured in the inside of the case 3 held in an electrolyte solution pouring posture where the X axis direction of the electrode assembly 2 is directed in the vertical direction, the electrolyte solution is guided to one end 201 of the electrode assembly 2 by the guide portion 8A.

Further, in the inside of the case 3, the tube shaped guide portion 8A may not extend to one end 201 of the electrode assembly 2 from the electrolyte solution pouring hole 325A which faces the other end 202 of the electrode assembly 2. That is, it is sufficient for the guide portion 8A to extend to a position beyond the other end 202 of the electrode assembly 2 from the electrolyte solution pouring hole 325A. When an electrolyte solution is poured in the inside of the case 3 held in an electrolyte solution pouring posture where the X axis direction is directed in the vertical direction, the electrolyte solution is guided toward one end 201 of the electrode assembly 2. Further, the discharge hole 325B is disposed at a position away from one end 201 of the electrode assembly 2 in the case 3, and hence, at the time of pouring an electrolyte solution, the electrolyte solution is minimally allowed to be discharged through the discharge hole 325B whereby the electrolyte solution can be efficiently supplied to one end 201 of the electrode assembly 2.

What is claimed is:
1. An energy storage device, comprising:
an electrode assembly formed by winding electrodes and a separator in a layered state;
a case for storing the electrode assembly therein, the case comprising an electrolyte solution sealing portion where an electrolyte solution pouring hole formed in the case is sealed;
a first guide portion which is arranged in an inside of the case and allows an electrolyte solution to flow toward one end of the electrode assembly in a winding axis direction from the electrolyte solution pouring hole; and
a second guide portion which is arranged in the inside of the case and allows a fluid to flow toward the electrolyte solution pouring hole from the inside of the case, and which prevents the electrolyte solution from flowing toward an other end of the electrode assembly in the winding axis direction from the electrolyte solution pouring hole or suppresses the electrolyte solution from flowing toward the other end of the electrode assembly in the winding axis direction from the electrolyte solution pouring hole, wherein the case includes a wall which is substantially parallel to the winding axis direction, the electrolyte solution pouring hole is formed on the wall, and the first guide portion and the second guide portion are arranged between the wall and the electrode assembly, wherein, between the wall and the electrode assembly, the electrolyte solution flows through the first guide portion in a same direction as a direction that the fluid flows through the second guide portion.

2. The energy storage device according to claim 1, wherein the case further comprises a discharge sealing portion where a discharge hole formed in the case is sealed, and wherein, in the winding axis direction, the discharge hole is formed at a position closer to the other end of the electrode assembly than the electrolyte solution pouring hole.

3. The energy storage device according to claim 2, wherein the discharge hole is formed at a position where a fluid which passes the second guide portion is allowed to be discharged to an outside of the case, the position being closer to the second guide portion than the electrolyte solution pouring hole is, and wherein the electrolyte solution pouring hole is formed at a position closer to the first guide portion than the discharge hole is.

4. The energy storage device according to claim 1, wherein the first guide portion comprises a check valve which allows the fluid to flow toward the one end of the electrode assembly from the electrolyte solution pouring hole, and prevents the fluid from flowing toward the electrolyte solution pouring hole from the inside of the case.

5. The energy storage device according to claim 1, wherein the second guide portion comprises a check valve which allows the fluid to flow toward the electrolyte solution pouring hole from the inside of the case, and prevents the fluid from flowing toward the other end of the electrode assembly through the electrolyte solution pouring hole.

6. The energy storage device according to claim 1, wherein the second guide portion includes a mesh member which is arranged so as to intersect with a flow passage of the fluid flowing toward the electrolyte solution pouring hole from the inside of the case.

7. The energy storage device according to claim 1, wherein the first guide portion and the second guide portion are formed into an integral body.

8. The energy storage device according to claim 1, wherein the winding axis direction extends in a longitudinal direction of an extension of the electrode assembly.

9. The energy storage device according to claim 1, wherein, between the wall and the electrode assembly, the second guide portion prevents the fluid to flow in a direction opposite to the direction that the electrolyte solution flows through the first guide portion.

10. An energy storage device, comprising: an electrode assembly formed by winding electrodes and a separator in a layered state;
a case for storing the electrode assembly therein, the case comprising an electrolyte solution sealing portion where an electrolyte solution pouring hole formed in the case is sealed;
a first guide portion which is arranged in an inside of the case and allows an electrolyte solution to flow toward one end of the electrode assembly in a winding axis direction from the electrolyte solution pouring hole; and a second guide portion which is arranged in the inside of the case and allows a fluid to flow toward the electrolyte solution pouring hole from the inside of the case, and which prevents the electrolyte solution from flowing toward an other end of the electrode assembly in the winding axis direction from the electrolyte solution pouring hole or suppresses the electrolyte solution from flowing toward the other end of the electrode assembly in the winding axis direction from the electrolyte solution pouring hole, wherein the case includes a wall which is substantially parallel to the winding axis direction, the electrolyte solution pouring hole is formed on the wall, and the first guide portion and the second guide portion are arranged between the wall and the electrode assembly, wherein the first guide portion comprises a first flow control portion that pivots away from the wall to pass the electrolyte solution through the first guide portion, and wherein the second guide portion comprises a second flow control portion that, in a same direction that the first flow control portion pivots away from the wall, pivots away from the wall to pass the fluid through the second guide portion.

11. A method of manufacturing an energy storage device which includes an electrode assembly formed by winding electrodes and a separator in a layered state, and a case for storing the electrode assembly therein, the case comprising an electrolyte solution sealing portion where an electrolyte solution pouring hole formed in the case is sealed, wherein the method comprises:
pouring an electrolyte solution in the case through the electrolyte solution pouring hole which is in a non-sealed state, the case being provided with:
a first guide portion which is arranged in an inside of the case and allows an electrolyte solution to flow toward one end of the electrode assembly in a winding axis direction from the electrolyte solution pouring hole; and
a second guide portion which is arranged in the inside of the case and allows a fluid to flow toward the electrolyte solution pouring hole from the inside of the case, and which prevents the electrolyte solution from flowing toward an other end of the electrode assembly in the winding axis direction from the electrolyte solution pouring hole or suppresses the electrolyte solution from flow toward the other end of the electrode assembly in the winding axis direction from the electrolyte solution pouring hole,
wherein the case includes a wall which is substantially parallel to the winding axis direction, the electrolyte solution pouring hole is formed on the wall, and the first guide portion and the second guide portion are arranged between the wall and the electrode assembly, and
wherein, between the wall and the electrode assembly, the electrolyte solution flows through the first guide portion in a same direction as a direction that the fluid flows through the second guide portion.

12. The method of manufacturing the energy storage device according to claim 11, wherein
the case includes a discharge sealing portion where a discharge hole formed in the case is sealed, the discharge hole is formed at a position closer to the other end of the electrode assembly than the electrolyte solution pouring hole is in the winding axis direction, and the pouring of the electrolyte solution is performed in a state where the discharge hole is not sealed.

13. The method of manufacturing the energy storage device according to claim 12, wherein the method further includes bringing the inside of the case into a state where a pressure is lower than an atmospheric pressure by discharging the fluid which is present in the case to an outside through the discharge hole, and the pouring of the electrolyte solution is performed together with bringing the inside of the case into a low pressure state or after bringing the inside of the case into a low pressure state.

14. The method of manufacturing the energy storage device according to claim 11, wherein the method further includes bringing the inside of the case into a state where a pressure is lower than an atmospheric pressure by discharging the fluid which is present in the case to an outside through the electrolyte solution pouring hole, portions of the case except for the electrolyte solution pouring hole has an airtight structure, and the pouring of the electrolyte solution is performed after bringing the inside of the case into a low pressure state.

15. The method of manufacturing the energy storage device according to claim 11, wherein in the pouring of the electrolyte solution, the electrolyte solution is poured in the case with the case held in a posture where one end of the electrode assembly is positioned below the other end of the electrode assembly.

16. The method of manufacturing the energy storage device according to claim 15, wherein in the pouring of the electrolyte solution, the electrolyte solution is poured in the case with the case held in a posture where the winding axis direction of the electrode assembly stored in the case is directed in the vertical direction.

17. The method of manufacturing the energy storage device according to claim 11, wherein the first guide portion has a check valve which allows the fluid to flow toward one end of the electrode assembly from the electrolyte solution pouring hole, and prevents the fluid from flowing toward the electrolyte solution pouring hole from the inside of the case.

18. The method of manufacturing the energy storage device according to claim 11, wherein the second guide portion has a check valve which allows the fluid to flow toward the electrolyte solution pouring hole from the inside of the case, and prevents the fluid from flowing toward the other end of the electrode assembly through the electrolyte solution pouring hole.

19. The method of manufacturing the energy storage device according to claim 11, wherein the second guide portion has a mesh member which is arranged so as to intersect with a flow passage of the fluid flowing toward the electrolyte solution pouring hole from the inside of the case.

* * * * *